US 7,502,615 B2

(12) United States Patent
Wilhoite et al.

(10) Patent No.: US 7,502,615 B2
(45) Date of Patent: Mar. 10, 2009

(54) HANDOFF FOR CELLULAR AND INTERNET PROTOCOL TELEPHONY

(75) Inventors: Michael T. Wilhoite, Chicago, IL (US); Inderdeep Singh, Glenview, IL (US); Steven H. Blumenthal, Lexington, MA (US)

(73) Assignee: Bridgeport Networks, Inc., Chicago, IL (US)

( * ) Notice: Subject to any disclaimer, the term of this patent is extended or adjusted under 35 U.S.C. 154(b) by 0 days.

(21) Appl. No.: 11/183,534

(22) Filed: Jul. 18, 2005

(65) Prior Publication Data

US 2006/0116127 A1 Jun. 1, 2006

Related U.S. Application Data

(60) Provisional application No. 60/588,438, filed on Jul. 16, 2004, provisional application No. 60/670,855, filed on Apr. 12, 2005, provisional application No. 60/668,474, filed on Apr. 5, 2005, provisional application No. 60/625,288, filed on Nov. 5, 2004.

(51) Int. Cl.
*H04W 36/00* (2006.01)
*H04W 4/00* (2006.01)
*H04M 3/42* (2006.01)

(52) U.S. Cl. .................. 455/442; 370/331
(58) Field of Classification Search ............ 455/414.1, 455/420, 422.1, 445
See application file for complete search history.

(56) References Cited

U.S. PATENT DOCUMENTS

| | | | |
|---|---|---|---|
| 5,159,592 A | 10/1992 | Perkins | |
| 5,325,362 A | 6/1994 | Aziz | |
| 5,708,655 A | 1/1998 | Toth et al. | |
| 5,726,984 A | 3/1998 | Kubler et al. | |
| 5,896,369 A | 4/1999 | Warsta et al. | |
| 5,991,639 A | 11/1999 | Rautiola et al. | |
| 6,009,330 A | 12/1999 | Kennedy, III et al. | |
| 6,026,153 A | 2/2000 | Fuller et al. | |
| 6,038,446 A | 3/2000 | Courtney et al. | |
| 6,038,451 A | 3/2000 | Syed et al. | |

(Continued)

FOREIGN PATENT DOCUMENTS

EP 1 294 204 A1 8/2001

(Continued)

OTHER PUBLICATIONS

Fors, Chad M. "Integrated WLAN-Cellular Voice Systems" IEEE 2003 Sarnoff Symposium, 20 pages.

(Continued)

*Primary Examiner*—Alexander Eisen
*Assistant Examiner*—Michael T Thier
(74) *Attorney, Agent, or Firm*—Occhiuti Rohlicek & Tsao LLP

(57) ABSTRACT

A telephone system supports communication with user devices over both a cellular radio network as well as over an Internet Protocol (IP) network, and enables roaming and active call handoff between cellular and IP domains. Components of the system interact with conventional cellular telephone systems, for example, by emulating behavior of control components, providing proxy services for conventional components, transporting cellular telephone control communication over IP connections, or by simulating cellular operating characteristics of user devices operating in an IP domain.

5 Claims, 20 Drawing Sheets

U.S. PATENT DOCUMENTS

| | | | |
|---|---|---|---|
| 6,052,725 | A | 4/2000 | McCann et al. |
| 6,131,028 | A | 10/2000 | Whitington |
| 6,161,008 | A | 12/2000 | Lee et al. |
| 6,167,119 | A | 12/2000 | Bartholomew et al. |
| 6,185,204 | B1 | 2/2001 | Voit |
| 6,198,920 | B1 | 3/2001 | Doviak et al. |
| 6,282,574 | B1 | 8/2001 | Voit |
| 6,304,753 | B1 | 10/2001 | Hartmaier |
| 6,317,484 | B1 | 11/2001 | McAllister |
| 6,353,607 | B1 | 3/2002 | Valentine et al. |
| 6,393,014 | B1 | 5/2002 | Daly et al. |
| 6,400,937 | B1 * | 6/2002 | Charas et al. ............... 455/403 |
| 6,400,946 | B1 | 6/2002 | Vazvan et al. |
| 6,418,324 | B1 | 7/2002 | Doviak et al. |
| 6,466,556 | B1 | 10/2002 | Boudreaux |
| 6,519,242 | B1 | 2/2003 | Emery et al. |
| 6,526,033 | B1 | 2/2003 | Wang et al. |
| 6,535,607 | B1 | 3/2003 | Chandersekaran et al. |
| 6,542,497 | B1 | 4/2003 | Curry et al. |
| 6,560,216 | B1 | 5/2003 | McNiff et al. |
| 6,591,103 | B1 | 7/2003 | Dunn et al. |
| 6,594,253 | B1 | 7/2003 | Sallberg et al. |
| 6,594,666 | B1 | 7/2003 | Biswas et al. |
| 6,597,910 | B1 | 7/2003 | Ra |
| 6,647,260 | B2 | 11/2003 | Dusse et al. |
| 6,647,426 | B2 | 11/2003 | Mohammed |
| 6,671,506 | B1 | 12/2003 | Lee |
| 6,680,923 | B1 | 1/2004 | Leon |
| 6,711,146 | B2 | 3/2004 | Yegoshin |
| 6,721,306 | B1 | 4/2004 | Farris et al. |
| 6,721,565 | B1 | 4/2004 | Ejzak et al. |
| 6,754,489 | B1 | 6/2004 | Roux |
| 6,754,833 | B1 | 6/2004 | Black et al. |
| 7,003,295 | B1 | 2/2006 | Cook et al. |
| 7,003,298 | B1 | 2/2006 | Jagadeesan |
| 7,280,530 | B2 | 10/2007 | Chang et al. |
| 7,283,823 | B2 | 10/2007 | Pearce et al. |
| 2002/0067707 | A1 | 6/2002 | Morales et al. |
| 2002/0075850 | A1 | 6/2002 | Cruz et al. |
| 2002/0111169 | A1 | 8/2002 | Vaghni |
| 2002/0147008 | A1 | 10/2002 | Kallio |
| 2002/0155834 | A1 | 10/2002 | Olmstead et al. |
| 2003/0076808 | A1 | 4/2003 | McNiff et al. |
| 2003/0114158 | A1 | 6/2003 | Soderbacka et al. |
| 2003/0134648 | A1 | 7/2003 | Reed et al. |
| 2003/0134650 | A1 | 7/2003 | Sundar et al. |
| 2003/0157935 | A1 | 8/2003 | Kauhanen |
| 2003/0187949 | A1 | 10/2003 | Bhatt et al. |
| 2003/0206520 | A1 | 11/2003 | Wu et al. |
| 2003/0216144 | A1 * | 11/2003 | Roese et al. ............. 455/456.1 |
| 2003/0224795 | A1 | 12/2003 | Wilhoite et al. |
| 2004/0008645 | A1 | 1/2004 | Janevski et al. |
| 2004/0008661 | A1 | 1/2004 | Myles et al. |
| 2004/0062223 | A1 | 4/2004 | Boyd et al. |
| 2004/0087307 | A1 | 5/2004 | Ibe et al. |
| 2004/0114553 | A1 | 6/2004 | Jiang et al. |
| 2004/0132500 | A1 | 7/2004 | Rogalski et al. |
| 2004/0146021 | A1 | 7/2004 | Fors et al. |
| 2004/0203788 | A1 * | 10/2004 | Fors et al. ................... 455/439 |
| 2005/0035857 | A1 * | 2/2005 | Zhang et al. ........... 340/539.13 |
| 2005/0090259 | A1 | 4/2005 | Jain et al. |
| 2005/0198337 | A1 * | 9/2005 | Sun et al. .................... 709/230 |

FOREIGN PATENT DOCUMENTS

| | | |
|---|---|---|
| EP | 1 244 323 B1 | 9/2002 |
| EP | 1 296 582 A2 | 3/2003 |
| WO | 9716916 | 5/1997 |
| WO | 00/02406 A1 | 1/2000 |
| WO | 01/31842 A2 | 5/2001 |
| WO | 0176276 | 10/2001 |
| WO | 0249298 | 6/2002 |
| WO | 03061177 | 7/2003 |
| WO | 03085992 | 10/2003 |
| WO | 2004036770 | 4/2004 |
| WO | 2004006876 | 8/2004 |
| WO | 2004066707 | 8/2004 |

OTHER PUBLICATIONS

Chad Ford et al. "Integrated WLAN-Cellular Voice Systems". Global Telecommunications Solutions Sector, Motorola, Inc., 4 pages.

Robert L. Geiger et al. "Wireless Network Extension using Mobile IP". Proceedings of COMPCON, 1996, pp. 9-14.

Nishith D. Tripathi et al. "Handoff in Cellular Systems". IEEE Personal Communications, Dec. 1998, pp. 26-37.

Sirin Tekinay and Bijan Jabbari, "Handover and Channel Assignment in Mobile Cellular Networks", IEEE Communications Magazine, Nov. 1991, pp. 42-46.

Moe Rahnema, "Overview of the GSM System and Protocol Architecture", IEEE Communications Magazine. Apr. 1993, pp. 92-100.

Wanjiun Liao et al., "VoIP Mobility in IP/Cellular Network Internetworking", IEEE Communications Magazine, Apr. 2000, pp. 70-75.

Kaveh Pahlavan et al., "Handoff in Hybrid Mobile Data Networks", IEEE Personal Communications, Apr. 2000, pp. 34-47.

*International Search Report for PCT/US05/25353*, Sep. 20, 2006.

*Written Opinion of the International Searching Authority for PCT/US05/25353*, Sep. 20, 2006.

Preliminary Report on Patentability for International Application No. PCT/US2005/025353 mailed Jan. 25, 2007.

* cited by examiner

HANDOFF FOR CELLULAR AND INTERNET PROTOCOL TELEPHONY

CROSS-REFERENCE TO RELATED APPLICATIONS

This application claims the benefit of the following U.S. Provisional Applications: Ser. No. 60/588,438, filed Jul. 16, 2004; Ser. No. 60/670,855, filed Apr. 12, 2005; Ser. No. 60/668,474 filed Apr. 5, 2005; and Ser. No. 60/625,288, filed Nov. 5, 2004. Each of these applications is incorporated herein by reference.

The application is also related to PCT Application No. PCT/US05/25353, titled "PRESENCE DETECTION AND HANDOFF FOR CELLULAR AND INTERNET PROTOCOL TELEPHONY," and to U.S. application Ser. No. 11/183,379, titled "PRESENCE DETECTION FOR CELLULAR AND INTERNET PROTOCOL TELEPHONY," each of which is being filed concurrently with the present application on Jul. 18, 2005. Each of these applications is incorporated herein by reference.

This application is also related to U.S. application Ser. No. 10/463,111, filed Jun. 16, 2003, which is a continuation of PCT Application No. PCT/US01/48920, published Jun. 20, 2002, as Publication WO 02/49298. Each of the above-referenced applications is incorporated herein by reference.

BACKGROUND

Cellular telephone systems provide mobility to users allowing them to maintain a presence on the cellular telephone network as they travel over a wide geographic area. More recently, data network based voice communication, for example, using Voice-over-IP (VoIP) protocols has been applied telephone communication, for example, providing telephone services to customers using VoIP based telephone devices. An approach has been proposed to coordinate cellular telephone and IP based telephony such that calls to a cellular telephone user can be directed to a IP based telephone when the user can receive calls as such a telephone, and calls can be handed off between an IP based connection and a cellular telephone based connection.

In addition, mobile telephone units are becoming available that include radio interfaces to both cellular telephone radio networks, and wireless local area networks. For example, a user can use telephone services over the cellular network while accessing data services over the wireless local area network.

SUMMARY

In one aspect, a telephone system supports communication with user devices that can communicate over either or both of a cellular radio network and a data network, such as an Internet Protocol (IP) network, and enables roaming and active call handoff between cellular and IP domains. Presence of a user near a suitable IP network can be determined used in controlling transitions between the domains. Components of the system interact with conventional cellular telephone systems, for example, by emulating behavior of control components, providing proxy services for conventional components, transporting cellular telephone control communication over IP connections, or by simulating presence of user devices on cellular radio networks or cellular operating characteristics of user devices while they are operating in an IP domain.

In another aspect, in general, a method for handoff of telephone sessions includes maintaining an active telephone session between a mobile unit and a telephone system over the data communication system. While maintaining the session over the data communication system, information associated with a radio system associated with the telephone system is determined. The active telephone session is then handed off from the data communication system to the radio system according to the determined information.

One or more of the following features may be included.

The determined information includes signal characteristics of radio system, or includes radio channel information (e.g., Candidate Cell List, Candidate Transmission Channel List) for the radio system.

The telephone system includes a cellular telephone system and the data communication system includes a data network, such as an Internet Protocol (IP) network or a wireless local area network.

Prior to maintaining the session over the data communication network, the active telephone session is maintained between the mobile unit over a radio system of the telephone system. Radio channel information is received at the mobile unit over the radio system. Communication between the mobile unit and the telephone system is then established over a data communication system. The active telephone session is then handed off from the radio system of the telephone system to the data communication system.

The mobile unit can receive a candidate channel list for a cellular telephone system, and measure signal strength characteristics for each of the channels of the candidate channel list.

The candidate channel list to the telephone system is provided after establishing communication between the mobile unit and the telephone system, and receiving the candidate list from the telephone system prior to handing off the session from the data network to the radio system.

In another aspect, in general, a mobile unit is coupled over a data network with a first device. The mobile unit is capable of communication over a radio network of a mobile telephone system. Control information is provided from the first device to the telephone system that simulates presence of the mobile unit on the radio network.

The control information can include, for example, signal characteristics, radio channel information, or authentication information.

In another aspect, in general, communication between a mobile unit and a telephone system over a radio system of a telephone system and over a data communication system coupled to the telephone system are concurrently maintained. Signal characteristics are measured based on communication with the mobile unit over the radio system. Simulated signal characteristics, which are associated with communication with the mobile unit over the data communication system, are also computed. The simulated signal characteristics are provided to the telephone system.

One or more of the following features may be included.

The measured signal characteristics are provided in conjunction with the simulated signal characteristics.

The approach further includes controlling association of the mobile unit with one of the radio system and the data communication system according to the provided signal characteristics.

Computing the simulated signal characteristics includes computing the simulated characteristics to affect association of the mobile unit with one of the radio system and the data communication system, for example, computing the simulated signal characteristics to be superior to the measured signal characteristics to control the association of the mobile unit with the data communication system.

In another aspect, in general, a method includes communicating telephone system control information between a dual-mode device and the telephone system, and performing a handoff of the dual mode device between the telephone system and the data network. The telephone control information is passed over a data network encapsulated in a data network communication protocol, and the handoff is performed using the encapsulated telephone control information.

One or more of the following features may be included.

The data network communication protocol includes a session control protocol, such as Session Initiation Protocol (SIP).

The telephone system control information includes telephone system signal characteristic information, or telephone system radio channel information.

In another aspect, in general, a dual mode device is used for communicating over a telephone system and a data network. The device includes a data network client, including components for establishing communication sessions over the data network, a telephone system client, including components for establishing communication sessions over the telephone system, and a service controller coupled to the data network client and to the telephone system client which enables a handoff of an active communication session between the data network client and the telephone system client. The data network client may be configured to send and/or receive encapsulated telephone system control information, and pass the telephone control information to the service controller. The telephone control information may be encapsulated in session control protocol messages.

In other aspects, software stored on a computer readable medium includes instructions for causing a processing system to perform all the steps of the methods of any of the aspects described above.

In other aspects, telecommunication system components are configured to perform the steps of the methods described above.

In another aspect, in general, a location of a mobile unit of a telephone system is detected. The detected location of the mobile unit is used to selectively enable a user to receive calls over a data communication system coupled to the telephone system.

One or more of the following features may be included.

The detected location of the mobile unit is used to selectively disable receiving calls to the mobile unit over a radio system of the telephone system.

The telephone system is controlled to selectively enable the user to receive calls over the radio system of the telephone system and over the data communication system coupled to the telephone system.

The telephone system can include a cellular telephone system.

The data communication system can include a data network, such as an Internet Protocol (IP) network and/or a wireless local area network.

Detecting the location of the mobile unit can be performed automatically, and the can be performed at the mobile unit or using a fixed device.

Detecting the location of the mobile unit includes receiving information from a position sensing system, such as from a global positioning system (e.g., a GPS system).

Detecting the location of the mobile unit includes receiving information through the radio system of the telephone system, for example, receiving cell-related information through a cellular radio system. The cell-related information can include a candidate channel list for communicating on the radio system. Receiving information through the radio system can also include determining signal characteristics of signals received over the radio system.

Detecting the location of the mobile unit includes accessing location-related information at the mobile unit, for example, by retrieving the location-related information from a storage in the mobile unit. The location-related information associated can be stored during a prior time when the mobile unit was at the location, for example, associated with receiving a command from the user indicative of the location of the mobile unit.

Detecting proximity of the mobile unit to the fixed device includes detecting proximity of an electronic device of the mobile device.

Detecting proximity of the mobile unit includes detecting proximity of a radio frequency identification device, for example, a Radio Frequency Identification Device (RFID).

Detecting proximity of the electronic device includes using a wireless transmission from the electronic device, for example, including receiving communication according to a Bluetooth standard or a Zigbee standard from the electronic device.

Detecting proximity of the mobile unit includes receiving radio transmissions from the mobile unit in a frequency band used for radio transmissions in the radio system of the telephone system.

Detecting proximity of the mobile unit includes simulating a cellular radio station at the fixed device.

The radio transmission from the mobile unit in the frequency band used for radio transmissions in the radio system includes a registration request.

Detecting the location of the mobile unit includes detecting placement of the mobile unit in a predetermined location associated with the fixed device. The fixed device can include a pressure-sensitive device, such as a devices with a pressure-sensitive pad. The fixed device can include a cradle for mating with the mobile unit.

Detecting the location of the mobile unit further includes coupling the fixed device to a computer coupled to the data communication system, and receiving a signal at the computer from the fixed device indicative of placement of the device.

Detecting the location of the mobile unit includes attempting to communicate with the data communication system, for example, by attempting to communicate over a wireless system of the data communication system. Attempting to communicate over the wireless system of the data communication system can include attempting to communicate using a wireless access point.

Detecting the location of the mobile unit includes detecting the location of the mobile unit according to success in communicating with the data communication system.

Controlling the telephone system to selectively enable a user to receive calls over a radio system of the telephone system and/or over a data communication system coupled to the telephone system can include establishing communication with the telephone system over the data communication system and passing registration information for the mobile unit over the data communication system to the telephone system.

Establishing communication with the telephone system over the data communication system includes establishing communication between the mobile unit and the telephone system.

Establishing communication with the telephone system over the data communication system includes establishing communication between a device separate from the mobile unit and the telephone system, and enabling the user to receive calls over the data communication system includes enabling the user to receive calls at the device separate from the mobile unit.

The device separate from the mobile unit includes a computer in proximity to the mobile unit.

The telephone system is controlled to enable the user to initiate calls over the data communication system.

The telephone system is controlled to enable hand off active telephone calls between the radio system of the telephone system and the data communication system according to the detected location of the mobile unit.

In another aspect, in general, a method for communication includes associating a set of voice terminals with a user. The user has a mobile device. Proximity of the user to the voice terminals by determined means of the mobile device. The set of voice terminals is notified of calls to the user when the user is determined to be in the proximity to the voice terminals.

One or more of the following features may be included.

The mobile device is notified of the calls to the user when the user is determined to be in the proximity to said voice terminals.

The set of voice terminals communicate in a wireless local area network. For example, the set of voice terminals are associated with a subnet Internet Protocol address or with a destination phone number.

The mobile device communicates in a wireless cellular network. For example, calls to the user are received in the wireless cellular network.

The mobile device establishes a communication in the wireless local area network.

Determining proximity of the user to the voice terminals includes establishing communication of the mobile device in the wireless local area network.

Establishing the communication of the mobile device in the wireless local area network includes registering the mobile device with a VoIP service.

In another aspect, in general, a method of internetwork signaling includes determining the presence of a first mobile device in a second wireless network, the first mobile device being registered in a first wireless network. The first wireless network has a first service provider and the second wireless network has a second service provider. The first device is registered in the second wireless network with the second service provider. The first mobile device is associated with a set of one or more phones, wherein at least some of the set of phones communicate in the second wireless network.

One or more of the following features may be included.

The set of phones is notified of a call to the first device received in the first wireless network.

The presence of the first mobile device in the second wireless network is determined when the first mobile device establishes communication in the second wireless network.

Registering the first device in the second wireless network comprises providing location information to the second service provider.

The location information includes at least one of a routable Internet Protocol address, a host name, and text information.

Associating the first mobile device with a set of phones is determined by information provided when registering the first device in the second wireless network.

Associating the first mobile device with a set of phones is determined by the second service provider.

Associating the first mobile device with a set of phones is determined by observing the source IP address of the IP packets in the second wireless network.

Some of the phones communicate in a third network having a third service provider. For example, the third network includes the PSTN.

The step of notifying includes alerting all the associated phones, alerting the phones from the second service provider, and/or alerting the phones from the third service provider.

The first service provider and the second service provider are a same service provider.

The step of notifying includes alerting the associated phones when the mobile device is busy.

The step of notifying includes alerting the associated phones with a distinct tone.

The step of notifying is performed by the first service provider.

The step of notifying is performed by the second service provider.

In another aspect, in general, the concept of Home Location Registers (HLRs) in a cellular network, which track locations of devices in a single access network, is extended to enable tracking of a device or presence of a device (or subscriber) in multiple access networks. This approach can enable selective delivery of calls to particular access networks and concurrent delivery of message traffic to multiple access networks.

In another aspect, in general, in a method supporting call delivery, registration requests are accepted from a subscriber terminal from each of multiple access networks. These access networks include a first access network and a different second access network. Concurrent registration of the subscriber terminal in the first and the second access networks is maintained. A request to establish communication with the subscriber terminal on the first access network is processed by the system. This processing includes selectively establishing communication with the subscriber terminal on one or more of the access networks.

One or more of the following features may be included.

The first access network can include a cellular telephone network, and the second access network can include a data network, such as an Internet Protocol based network. In general, the access networks can include one or more of a cellular telephone network, a data network, an Internet Protocol network, a voice-over-IP network, a cellular data network, a wireless data network, a wired data network, and a short-range radio network.

Accepting the registration requests includes receiving a registration request from the subscriber terminal on the first access network and transmitting a modified registration request for the subscriber terminal to a registration device for the first access network. A proxy registration device for the first access network can accept the registration request and transmit the modified request to the registration device. The registration request can include a request for registration with a home registration device, such as a Home Location Register. A proxy Home Location Register can accept the registration request and transmit the modified request to the Home Location Register.

The subscriber terminal on different access networks can be a same device (e.g., a multi-mode phone) or can be different devices.

Aspects can have one or more of the following advantages.

Providing a mechanism for handoff and roaming between a cellular domain and an data network (e.g., IP) domain that does not require tight integration with a cellular network's control components reduces the cost or effort required to provide such handoff and roaming capabilities. Not requiring modification of a cellular network's HLR function is a specific example of reducing the effort of integration. Similarly, employing standard inter-MSC signaling between a device (e.g., the NCG) and conventional MSCs in the cellular network is another example.

Simulating the presence of a subscriber on a cellular radio network when the subscriber is actually present on a data network permits operation of the cellular network with little or no modification while enabling delivery of calls over the data network.

When a subscriber is concurrently registered on two access networks, the approach can limit "thrashing" behavior between the two networks, for example, triggered by re-registration attempts on the cellular access network. This can avoid a need to turn off a subscriber cellular telephone when calls are to be delivered over an alternative access network.

Calls or messages over the least cost route for services or forking of services to multiple access networks.

In versions of the system that make use of extended HLR functionality, the full functionality of a cellular HLR does not have to be implemented through the use of a proxy. Although messages passed through the proxy may be modified, the basic HLR functionality remains in the native cellular HLR.

Detection of presence of a user in proximity to a suitable data network can reduce power consumption by allowing disabling a radio transmitter (or transceiver) for a radio network not in use.

Automatic detection of presence of a user in proximity to a suitable data network avoids the necessity of the user manually selecting the domain in which to receive or make calls.

Detection of imminent exit from a data network can provide sufficient time to hand off an active call to a cellular network, thereby avoiding dropping of the call.

Using information from the radio system itself for detecting a location of the mobile unit can avoid the need to use another radio system, thereby reducing transceiver power requirements.

Use of a passive device, such as an RFID tag, on the mobile unit, allows detection of the user in an area, such as in the user's office, without requiring active transmissions from the mobile unit.

Use of Bluetooth pairing between the mobile unit and a device that controls handoff and/or roaming provides a broadly available mechanism for presence detection.

Calls can be delivered to non-mobile devices in the user's proximity, thereby potentially providing a preferable way of delivering a call in aspects that may include cost, signal quality, and handset usability (e.g., comfort).

Other aspects and features of the invention are apparent from the following description, and from the claims.

DESCRIPTION OF DRAWINGS

FIG. 18A illustrates presence detection and registration; FIG. 18B illustrates call delivery to one access network; FIG. 18C illustrates call delivery to another access network; and FIG. 18D illustrates message delivery.

DESCRIPTION

1 System Architecture

Figure 1:
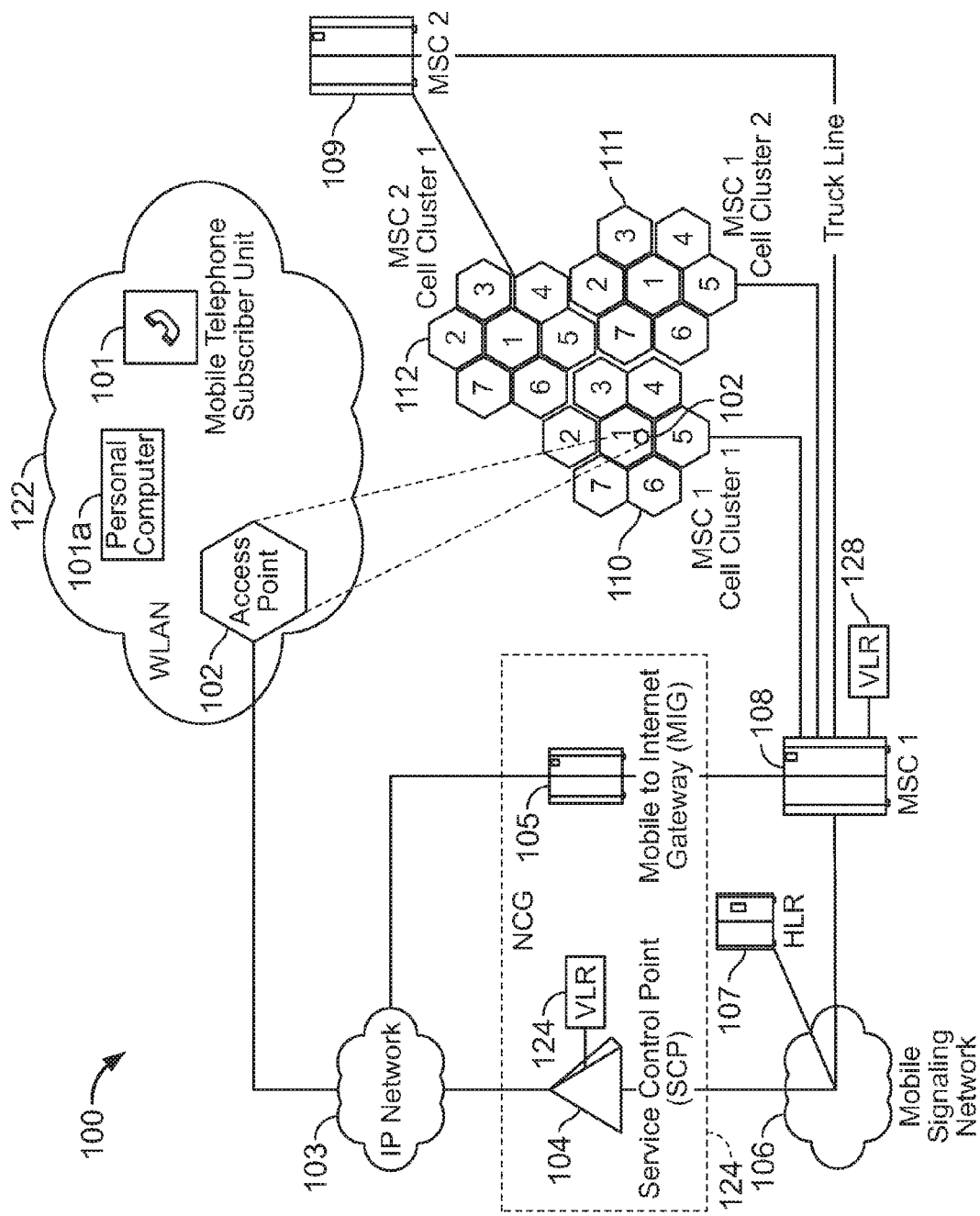
FIG. 1 is a block diagram of a mobile telephone communication system.

Referring to FIG. 1 a communications system 100 supports telephone communication using mobile telephones 101 (also referred to below generally interchangeably as "mobile stations (MS)," "subscriber units," and "user equipment (UE).") Some of these telephones (generally referred to below as "dual mode phones" or "WiFones") are capable of communicating using at least two approaches: a cellular telephone approach, and a wireless data network approach such as over a wireless local network (WLAN) 122. The capability to communicate using a WLAN 122 allows phone users ("subscribers') to have some calls routed via the WLAN 122 and to have other calls routed via a wireless link of the cellular telephone network. for example, depending on their location or proximity to a suitable WLAN. In at least some embodiments of the system, an active call can be handed off between the cellular radio network and the wireless data network without disrupting the call.

The system also supports communicating with mobile telephone users through devices on a data network when the user is in the proximity of such devices. For example, when the user is in the proximity of a suitable WLAN, the user can, for example, receive or make calls using a personal computer on WLAN 122 (or equivalently through a wired LAN) or to some other device, such as an analog telephone connected through an analog telephone adapter, a software-based VoIP phone on the user's personal computer, or a dedicated VoIP desk phone, on the local network. This capability allows calls placed to the subscriber's mobile telephone to be routed via the local area network rather than or in addition to being routed over a cellular telephone radio network.

Versions of the system 100 are compatible with cellular telephone approaches that include an EIA/TIA IS-95 digital cellular system, which makes use of code division multiple access (CDMA) technology and the IS-41 standard for mobility management, and a Global System for Mobile Communication (GSM) approach, which makes use the GSM Mobile Application Part (MAP), which provides similar functionality as IS-41. In the cases of CDMA and GSM telephone systems, as described in more detail below, the general approaches used in the system are similar, but are adapted to the particular characteristics and signaling methods for those telephone systems. Communications between components of the system can take place through communications protocols defined in American National Standards Institute section 41 (ANSI-41) and section 721 (Integrated Services User Part) and European Telephone Standards Institute (ETSI) section Global System Mobility (GSM). Alternative versions of the system can also be used with other cellular or non-cellular wireless or wireline telephone approaches (e.g., North America TDMA, PCS, satellite). In at least some embodiments, the equipment that provides an interface between the cellular telephone network and the data network emulates conventional components of the cellular telephone network and/or uses standard signaling approaches used within the cellular telephone network, thereby not necessitating changes or adaptations of the cellular telephone network to provide services over the data network.

Versions of the system 100 are compatible with wireless local area network (WLAN) approaches that use wireless Ethernet (e.g., IEEE 802.11(b)). Wireless Ethernet continues to emerge as a widely deployed wireless networking platform. Many private and publicly accessible WLANs have been deployed, for example, by companies for use by their employees and by commercial and public enterprises (e.g., airports and coffee shops) for their customers and users. Many cellular phone manufacturers have or are planning to install 802.11 wireless antennas and associated electronics in their phones in addition to the antennas and electronics for cellular communication. The mobile telephones 101 can include such telephones, with suitable software and/or hardware configuration for functioning with the system 100. Alternative wireless local network approaches include Bluetooth and approaches that make use of the Industry, Science and Medicine (ISM) band of frequencies or any other suitable band, public or private, or Infrared Data Association (IrDA) specification.

When a dual-model mobile telephone 101 is connected through a WLAN 122, voice and data communication to or from the mobile telephone 101 passes over the WLAN 122 preferably using the Internet Protocol (IP), with voice traffic and associated control data using a Voice-over-IP (VoIP) protocol. The WLAN is coupled to system components 124 over an IP Network 103, such as over the public Internet. As discussed further below, the system components 124 support the capability of roaming and call handoff between the cellular and IP-based communication domains. The system components 124 are collectively referred to as a "network convergence gateway" (NCG). Similarly, when a user's personal computer 101a is configured to receive and place calls instead of the user's mobile telephone (i.e., a single-mode telephone), voice traffic passes between the computer and the system components 124 over the IP Network 103.

The IP Network 103 can make use, for example, of a public or private network, dedicated communication links, or virtual private networks. The network communications between the WLAN 122 and the system components 124 can take place using Internet Engineering Task Force (IETF) Request for Comments 120 (TCP/IP), Data Over Cable System Interface Specification (DOCSIS), Asynchronous Transfer Mode (ATM), Digital Subscriber Line (DSL), or Fixed Wireless Systems. The data network can include a packet-switched data network. The data network over which communication passes can include a public network, such as the public Internet, or can be a private network, such as a data network operated or used by the cellular telephone carrier. Also a combination of public and private networks can be used, for example, providing a dual mode telephone or user premises device with a virtual presence on a private data network by securely tunneling communication between the device and the private network over a public network.

Referring to FIG. 1, the communication system 100 includes a number of components that are conventionally used in cellular telephone systems and/or in WLANs. A conventional Home Location Register (HLR) 107 and a conventional Mobile Switching Center (MSC) 108 are connected to the mobile signaling network 106, which allows the HLR 107 and the MSC 108 to exchange data. FIG. 1 shows two MSCs 108 (MSC 1) and 109 (MSC 2). Except where specified below, they are identical and discussion of MSC 1 also applies to MSC 2.

The HLR 107 includes a database that holds information on the subscriber units that are assigned to the MSC 108 as their home switch. Typical implementations of an HLR combine subscriber profiles from wide geographic locations. For example, one carrier has a single HLR for the entire west coast of the United States. The HLR contains the subscriber profile of record for purposes of call delivery, but does not typically or necessarily hold billing information. HLRs are independent of MSCs, user groups, and carriers, and are not typically shared by competitors.

The subscriber unit 101 is capable of radio communication with the MSC 108 via a radio link between the subscriber unit and a base station antenna (e.g., antenna 110) providing coverage for a cell using conventional mobile telephone methods. When the subscriber unit 101 is turned on and attempts to register with the MSC 108, the MSC retrieves current configuration data for the subscriber unit 101 from the HLR 107 in a conventional fashion. The configuration data can include calling restrictions, call forwarding activity, message waiting indicator, and authorizations, etc. Configuration data for the subscriber unit 101 retrieved from the HLR 107 is stored in a conventional visitor location register (VLR) 128, which is a database located in or otherwise associated with the MSC 108. Data in the VLR 128 is a subset of data in the HLR 107. Once the MSC 108 has the configuration data for the subscriber unit 101 stored in a VLR, then the MSC 108 can connect the subscriber unit 101 to called parties through the Public Switched Telephone Network (PSTN) (not shown) via existing cellular radio antennas 110, 111 controlled by the MSC, by conventional methods. In addition, the MSC 108 can route incoming calls from the PSTN to the subscriber unit 101 via another MSC 109 with a set of antennas 112 that may be closer to the subscriber unit 101, in a conventional fashion.

In the WLAN 122, a dual-mode subscriber unit 101 is capable of radio communication with one or more access points 102 using a low powered transceiver in the subscriber unit. The access point 102 includes an antenna as well as other electronics and software. The access point 102 operates on frequencies other than standard cellular frequencies or otherwise does not interfere with cellular communication on those frequencies. As introduced above, the access point provides a link to the wired telephone network (as well as wireless telephone networks and other communication systems) via a packet switched network, preferably using Voice over IP (VoIP) on the Internet. Similarly, a personal computer 101a implements telephone functions allowing the computer to make and received VoIP calls over the IP Network.

Different versions of the system can support only dual-mode phones, only single mode phones in conjunction with other VoIP devices for the users to communicate in the IP domain, or a mixture of both with some users having dual-mode phones, some users having separate VoIP devices, and some users having both.

The access point is typically owned by private party other than a telephone common carrier. The private party typically provides its own connection to the Internet. In this sense, such an access point is within a private domain. The access point may also be owned or operated by a telephone common carrier, for example, when the access point services a public area or when it is provided by the carrier for use at a customer's premises.

In addition to the conventional cellular telephone and WLAN components of the communication system 100, a number of additional components 124 support functionality related to roaming and call handoff between the cellular telephone and WLAN domains. These additional system components provide both voice signal paths and call control signal paths used to provide telephone services related to the subscriber unit 101 communicating through an access point 102.

The Access Point 102 passes call control signals between the subscriber unit and a Service Control Point (SCP) 104. That is, the access point does not necessarily provide services beyond forwarding of IP packets between the subscriber unit and IP Network. The Service Control Point (SCP) 104 is integrally involved in call delivery and hand-off services. SCP 104 includes a database with information on all subscribers comprising an identification of the access points with which the subscriber's mobile unit may connect. The SCP 104 is connected to a mobile signaling network 106, which may be an existing Signaling System Seven (SS7) network using ANSI-41 or a Global System Mobility (GSM) network or any other signaling network for mobile communications devices. As described further below, the SCP participates in the mobile signaling network without necessarily requiring modification of conventional components (e.g., HLR, MSC) of the mobile network. The SCP 104 is preferably implemented using redundant and fault tolerant equipment, for example, using a redundant pair of processors. The SCP holds a subscriber profile as it pertains to the use of the access point system, and maintains billing data.

A Mobile to Internet Gateway (MIG) 105 provides a signal path for voice information passing between the access point 102 and the telephone system. The MIG 105 converts between circuit switched signals and Internet Protocol (IP) packets. The MIG 105 connects one or more MSCs through trunk connections or though switch telephone connections through the PSTN (not shown in FIG. 1). The MIG 105 can connect calls originating through the access point 102 to the PSTN and can receive calls from the PSTN for delivery through the access point 102 to a subscriber unit 101. The MIG 105 is optionally coupled to one or more MSCs (e.g., MSC 108, 109) through trunk lines (not shown), or through other pre-established voice circuits, which can be used to pass voice information in call handoff between these MSCs and the NCG 124.

The Mobile to Internet Gateway (MIG) 105 is connected to the SCP 104 via the IP Network 103. This connection allows the MIG 105 to exchange data with the SCP 104. The MIG 105 is also connected to an Integrated Services User Part (ISUP) signaling network system (not shown). ISUP is the computer program application layer on top of SS7 that typical wire line central offices use today. The ISUP application allows the MIG 105 to transmit circuit-based telephone calls to or from the MSC 108. Because the MIG 105 is connected to the IP network 103, it can exchange packet-based telephone calls with the Internet network 103 by known protocols such as H.323, SIP, or MGCP.

When the subscriber unit 101 is turned on and attempts to register with the SCP 104 via the access point 102, or a VoIP device 101a attempts to register, the SCP receives current configuration data for the subscriber unit 101 from the HLR 107 in a conventional fashion using standard signaling approaches. The configuration data can include calling restrictions, call-forwarding activity, message waiting indicator, authorizations, etc. Configuration data for the subscriber unit 101 is stored in a VLR 124, which is a database located in or associated with the SCP 104. Once the SCP 104 has the configuration data for the subscriber unit 101 stored in a VLR, then the SCP 104 can connect the access point 102 to an in-session call or hand-off an in-session call to MSC 108, via the MIG 105, and the IP Network 103, by using conventional methods of exchanging control information within the mobile network.

The SCP 104 includes software with appropriate capabilities to provide call delivery services between the mobile and packet networks. The software module that handles the call hand-off functionality in the SCP 104 is referred to herein as an access mediation module. This functionality can be installed in existing SCP wireless telephone service equipment or can be included in stand-alone computers especially prepared for this purpose. The access mediation module can operate in conjunction with existing telephone switching systems, including multiple conventional MSCs and HLRs existing at various geographical locations, to provide the relevant functionality across a wide area in a cost-efficient manner. The MSC 108 communicates with the mobile subscriber units 101 that are within the MSCs geographical range at the time a call is made to or from the unit. Call hand-off can be made to any access point no matter where the access point is connected to the packet switched network because there are, in general, no geographical limitations on such networks. Pre-existing HLRs such as 107, and modified SCPs such as 104, each contain a database for each subscriber, with each subscriber being pre-assigned to a particular HLR and a particular SCP.

Each of the communications protocols used in the system define a series of commands, responses, and related data that are exchanged between telecommunications devices, in which the commands and the responses can include the related data. The form of this communication can be roughly divided into commands (inter-device requests to perform a function), responses (replies to the command, signaling that the requested function is complete), and parameters (data that can be conveyed within a command or a response and which denotes specific operations or triggers). Operations are functions that can be performed, while triggers represent status flags that initiate operations. MSCs, HLRs, conventional service control points, and standard ANSI-41, GSM, DOCSIS, and TCP/IP are well known to those of ordinary skill in the telecommunication industry, and their overall characteristics are not further described here.

2 Detecting Presence Near the IP Domain

In order to provide telephone services via the IP domain, the system 100 makes use of one or more approaches to detecting when the subscriber unit 101 is in an area in which the IP network can be used to communicate with the subscriber rather than using the cellular radio network. In the case of a dual-mode phone, the IP network can be used when the phone is in the proximity of a suitable access point 122. In general, only certain WLANs and their access points are candidates for providing telephone services for the subscriber unit. That is, not every WLAN is necessarily configured to provide telephone connectivity (e.g., call origination and call delivery) for the subscriber unit. In the case of communication through another type of VoIP device than the phone, the IP network can be used when the subscriber unit (and the subscriber) is in the proximity of a suitable VoIP device, such as the subscriber's personal computer.

Although a dual-mode subscriber unit 101 in general has the capability to concurrently communicate over a WLAN as well as over the cellular system, there are a number of reasons for preferably enabling only one or the other type of communication at one time.

A first issue is that while the phone's WLAN antenna is not near a wireless access point, enabling the phone's WLAN transceiver will consume at least some additional of unit's battery power searching for an access point. Similarly, when the unit is connected to the system through a WLAN, enabling the cellular transceiver will consume at least some additional power.

A second issue is that if the cellular radio of the device remains powered on, according to conventional cellular telephone procedures, the unit will periodically continue to register via the cellular radio network. As is described below, system will also continue to attempt to periodically register via the private domain network. These registrations may results in thrashing of registrations between the private domain network and the cellular radio network. An approach to mitigating such thrashing is described later in this document.

For both dual-mode phones and use of separate VoIP devices, another issue is that it is preferable for the user not to be required to choose over which network the call is routed or to even be aware of the choice made by the system. Rather the phone or system is able to detect which networks are present and through which network calls should be routed.

A number of approaches to controlling when the WLAN interface of a subscriber unit or the separate VoIP device is active are described below. In one type of approach, a device separate from the phone determines whether a phone is nearing a private IP domain. When the device determines that the phone is near an access point, IP connectivity to the phone or other VoIP device is established. For dual-mode phones, to establish VoIP connectivity the phone is instructed by the system (e.g., over the cellular radio) to power up its WLAN interface. If and when then phone has registered itself over the private domain and successfully established connectivity to the telephone network over the WLAN, the phone powers down its cellular transceiver. In the case of another type of VoIP device, establishing the IP connectivity with that device is carried out using data communication over the IP network.

In another type of approach, the phone itself determines that it is near an access point, and initiates the establishing of IP connectivity to itself or another VoIP device servicing the subscriber.

At least some of the approaches described below are applicable to transitions between cellular and IP domains both when calls are active (i.e., a call handoff) and when the telephone is not involved in an active call (i.e., roaming between domains). Handoffs of active calls are applicable to dual-mode phones, and are not necessarily feasible between single-mode mobile telephones and other VoIP devices.

2.1 Continuous Monitoring

In one approach, the access point 102 and a dual mode telephone 101 use a single communication process to both detect the proximity of the mobile phone and to also handle registration, hand-off, data and voice communications. That is, notwithstanding various advantages of powering down the WLAN interface in the phone, the phone continuously or repeatedly attempts to detect transmissions from an access point, or otherwise attempts to communicate with the access point, and determines when it successfully establishes a connection with a suitable access point that can provide access to the telephone system.

2.2 User Command

In another approach, the user provides an input (i.e., manual, voice) to the phone to indicate that it is, or may be, in the proximity of a candidate access point. In the case of a dual-mode phone, based on this input, the phone powers up the WLAN interface and attempts to establish a connection to the telephone system via that interface. Similarly, when the user is about to leave the vicinity of a WLAN, the user provides an input to the telephone that initiates a re-selection and handoff back to the cellular system. In the case of a single-mode phone used in conjunction with a separate VoIP device such as the user's personal computer, the user's manual input is communicated to the SCP and/or the VoIP device through the cellular network.

In another approach that makes use of a user command, the phone has information that indicates that it is, or may be, in the proximity of a suitable WLAN access point, and the phone prompts the user to make changes to their presence status once the system has detected that subscriber unit has entered, or departed from, a private domain network. This prompting can be accomplished in a variety of different ways. A first way is that the system sends the phone a short message service (SMS) message with a query for the user asking the user if he would like to change which device would be the primary device that the user would like to receive calls on. Another way of prompting the user is for the system to place an actual call to the user at their new location and ask the user to enter a PIN code, or speak a voice command that would be translated by voice recognition software on the system. The effect of this PIN, or voice command, would be to confirm that the user wants to change his location, or change the device on which he wants to receive calls.

2.3 Location Sensing by Subscriber Unit

In another type of approach, the subscriber unit 101 determines its geographic location and based on this location determines whether to initiate the process to make a transition to the IP domain. In the case of a dual-mode phone, the phone activates its WLAN interface to potentially establish connectivity to the telephone system through a suitable WLAN. In the case of a single-mode phone, the phone sends a message to the system to inform it of the unit's location, which then can initiate the transition to the IP domain. Different approaches make use of different degrees of accuracy of the determined geographic location. For some approaches, the accuracy is such that the phone may not be able to discriminate between being with range of a particular WLAN or not. Nevertheless, by being able to determine that the phone is out of range of all candidate WLANs, the phone is able at times to disable the WLAN interface to reduce power consumption without limiting its potential connectivity through the IP domain.

2.3.1 Cellular Signature

Using the established mobile telephone system features while active on the cellular network, the subscriber's mobile telephone regularly detects the cell site cluster identification, or "inference signature" that is characteristic of the cell sites that surround the mobile telephone. The cellular radio of the subscriber unit 101 periodically receives a Candidate Cell List from the serving base station. This list identifies the cells through which the phone could potentially communicate, and thereby provides a relatively coarse indication of the location of the unit. Each time the list is updated, the subscriber unit compares the entries in the list to stored values associated with candidate WLANs. The list provides a "signature" of the cellular radio environment that enables the phone to determine whether it is potentially in the proximity of a candidate WLAN site.

The stored "signatures" of candidate WLANs are determined by the user of a phone by manually taking a one-time "snap shot" of each of the cell sites and sectors that they are in on a regular basis just before entering an area in which they would prefer to have their calls routed through a private domain network. Alternatively, the signatures may be provided to the phone by the system, for example, based on a site survey at each candidate WLAN site.

Software within the user's dual-mode phone instructs the phone to power up the WLAN transceiver each time it enters the previously selected cell sites and sectors so that the antenna can attempt to connect with the private domain network through an access point. The phone would be able to deduce that it is nearing an IP domain access point because it will infer from information previously provided by the user that a private domain network access point is nearby. Once the phone creates an association with a private domain network through an access point and successfully registers with the telephone system, the cellular antenna would be powered down, and not be turned back on until the phone is to leave the WLAN.

One benefit of having the user pre-select the cell sites in which the 802.11 antenna would power up is that if the antenna were continually powered up, the phone could attach itself to whatever private domain access point it passed by. The user would not want to attach to any and all access points that they pass by because they may not be able to use that private domain network (e.g., no roaming agreement with that provider), or they may not be able to control the quality of the call over that access point. Whatever the reason, the user will in general only want their equipment to register on pre-selected access points, and this approach allows the user to dictate to the phone which access points to register on and which to ignore. Also, once the user selects the areas in which they would like the 802.11 antenna to power-up, the user's involvement in the process is over; from that point on the phone can do all the work.

In an alternative version of this approach, a finer grain "signature" can be used to determine location. For example, radio power levels sensed at the phone can be used to determine a more precise location and its associated candidate WLANs.

2.3.2 GPS

Increasingly, cellular telephones include accurate location determination modules, for example, based on the Global Positioning System (GPS). A GPS radio in the phone receives GPS satellite signals, which are used to determine latitude, longitude, and altitude. Each time these GPS parameters are updated the phone compares the entries of the GPS parameters to stored values associated with candidate WLANs. If the comparison indicates that the phone is near an access point, the phone can activate the WiFi radio and begin active scanning.

As with the signature approach, the GPS locations of candidate WLANs can be determined by user taking snapshots or by the system downloading the location to the phone.

Due to the accuracy of GPS, this approach can be used both for dual-mode phones as well as for single-mode phones with which proximity to a suitable VoIP device is detected by the phone, and the phone sends commands that cause the system to select the VoIP device for delivery of calls.

2.4 Proximity Detection

In another type of approach, a device associated with a WLAN (or VoIP device) detects the presence of a phone, and based on this detection initiates the transition to use of the IP domain rather than the cellular domain. In the case of a dual-mode phone, the phone is informed of its proximity allowing it to power up its WiFi radio. In the case of a single-mode phone and a separate VoIP device, the detection of the presence of the phone initiates use of the IP domain for telephone communication, without necessarily explicitly informing the phone to the transition. Specific versions of this approach differ in the detection approach and the way (if any) in which the phone is informed of its proximity.

2.4.1 RFID

In one approach to proximity detection, a Radio Frequency Identification (RFID) tag is embedded somewhere on the phone, and registration information (e.g., the phone's number) is stored within the RFID tag. RFID tags are passive devices that do not require any battery power, and do not actively transmit data. They pickup electromagnetic signals from the RFID readers and use the energy contained in that magnetic field to transmit back to the reader the information that is stored within the tag. The reader then sends the registration information for that phone to the SCP to register the subscriber on the private domain network. In the case of a VoIP device that is separate from the phone, the device is registered with the system. In the case of a dual-mode phone, the phone is informed of its proximity over the conventional cellular system, and the phone then initiates the registration procedure.

RFID tags carry little information, and because they have no power, the RFID readers should be within one or two feet of the RFID tag to pick up the information stored on the tags, with a higher end range of up to five feet. Therefore, it is preferable to have the RFID reader installed around the doorway of the each location at which the user plans to use a wireless access point for their calls. The user or owner/administrator of the WLAN would place an RFID reader wherever there is an access point for the user to use. Once the phone passes near the RFID reader, the reader notifies the system that the phone has entered the area (for example, their office) initiating registration of the user on the private domain network. In some common cases, an RFID reader will be installed around the user's office door, and the door to their home. RFID readers could also be placed on a desk, or in some sort of pad that the phone can be placed on that would pick up the signal from the RFID tag and transmit the information that way.

Figure 2:
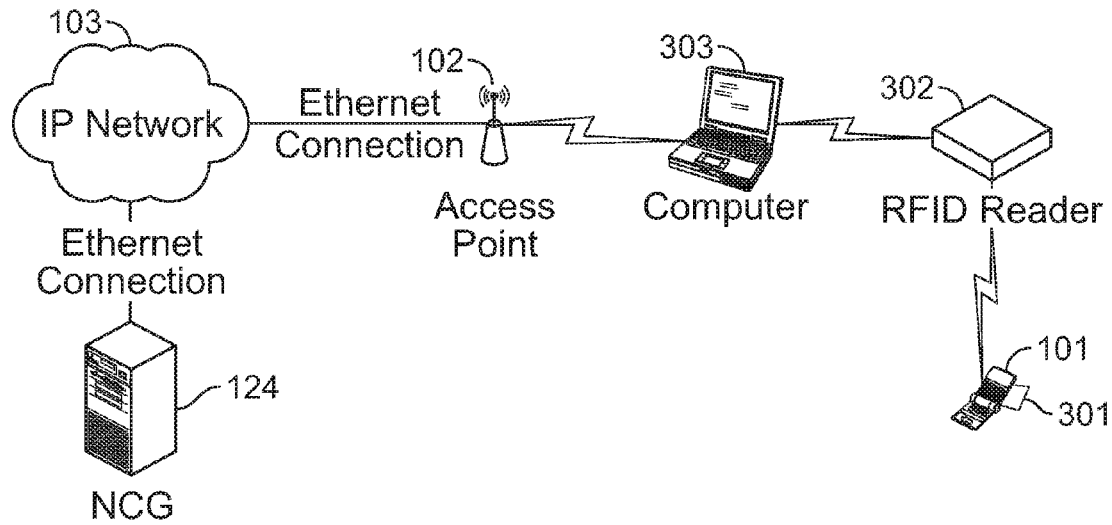
FIG. 2 is block diagram of a system that includes an RFID reader for detecting mobile telephones.
Figure 3:
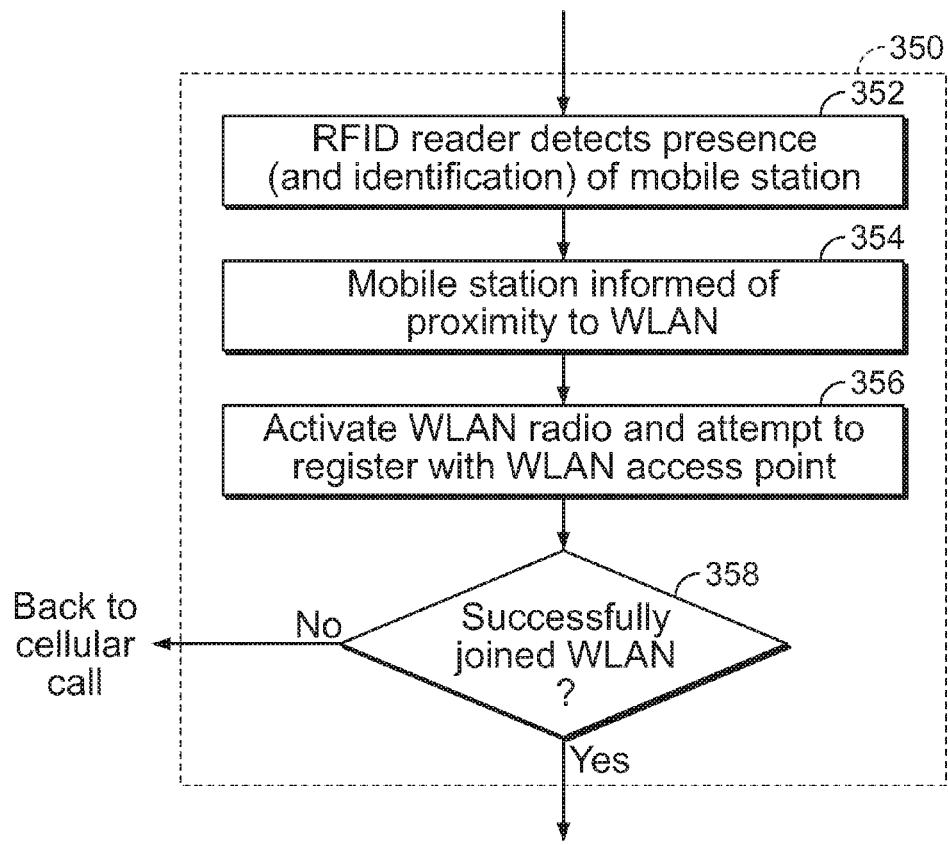
FIG. 3 is a flowchart of a RFID detection approach.

Referring to FIG. 2 and the detection process 350 in FIG. 3, when a dual-mode phone 101 with the embedded RFID tag 301 passes by a RFID reader 302 the RFID reader transmits the phone's registration information to a computer 303 (or other wired or wireless communications device) (step 352). The computer then communicates that information, as well as the location of the user, through an access point 102 over the IP network 103 to the SCP 104 of the NCG 124. The SCP then informs the phone of its proximity to the WLAN (step 354). The phone activates its WLAN transceiver and attempts to join the WLAN and access the SCP to complete the registration (step 356). If the phone successfully joins the WLAN and the SCP registers that phone (step 358) the SCP routes all calls to that user to whichever device the user has selected to receive calls at their current location. Otherwise, the phone remains in the cellular domain.

2.4.2 Bluetooth/Zigbee

In another approach, a phone has a low power radio that is not necessarily used for voice communication over the WLAN. For example, the phone may have a Bluetooth or Zigbee radio. At the WLAN site, in addition to the WLAN access point, an additional low power wireless transceiver is configured to be able to communicate with the phone. When the device establishes contact with this Zigbee radio on the phone, it determines the identity of the phone and in a manner similar to that used when an RFID tag is detected, initiates a transfer to the IP domain. In an alternative approach the Bluetooth or Zigbee network can optionally be used to pass information to the telephone, for example, to initiate it's joining the WLAN.

In one example of such an approach, entry of the phone into a personal area network is used as a presence mechanism. A personal area network (PAN) includes, for example, an interconnection of information technology devices within the range of an individual person, typically within a range of 10 meters. For example, a person traveling with a laptop, a personal digital assistant (PDA), and a portable printer could interconnect them without having to plug anything in, using some form of wireless technology. Typically, this kind of personal area network could also be interconnected to the Internet or other networks. Typically, a PAN is centered around one person, as compared to a wireless local area network (LAN), which typically serves multiple users.

One version of such a PAN-based presence mechanism uses Bluetooth technology. A Personal Area Network daemon (PANd), for example conforming to the Bluetooth SIG Personal Area Network Profile version 0.95a (June 2001), runs on a personal computer on a LAN, or in a router, equipped with Bluetooth radio. The user's phone also has a Bluetooth radio incorporated in it. The phone runs an application that listens for messages over a Bluetooth channel from the PANd and controls the phone's cellular radio according to control messages received over the Bluetooth channel from the PANd. In other versions, other Bluetooth profiles are alternatively used such that pairing between the phone and a device that can communicate with the NCG.

Figure 16:
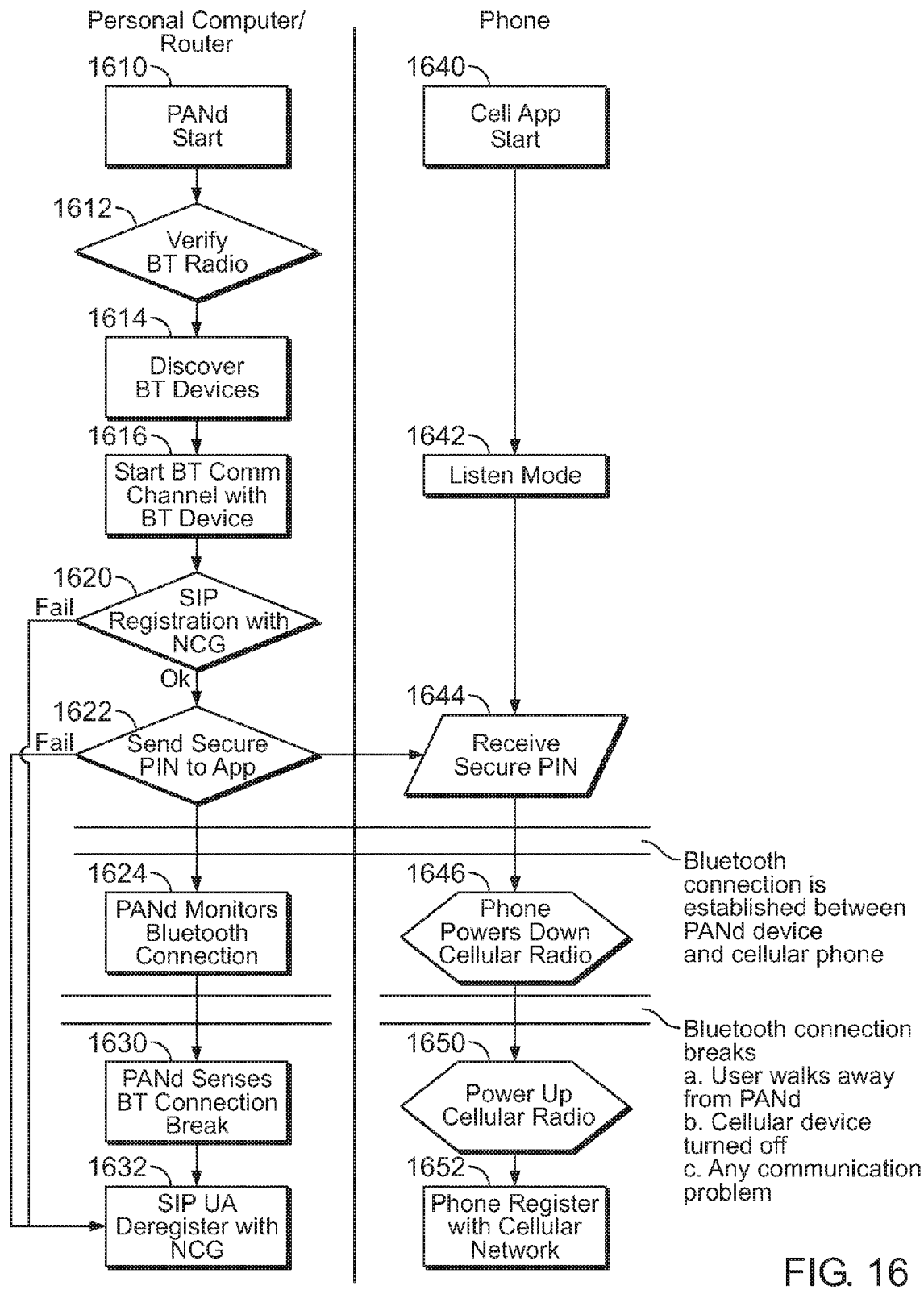
FIG. 16 is a flowchart for Bluetooth-based presence detection.

Referring to FIG. 16, initially, the PANd is started on the personal computer of router (step 1610). The PANd verifies the functionality of the Bluetooth (BT) radio (step 1612) and begin a phase in which it can discover Bluetooth devices (step 1614). On the phone, the cellular application that listens to the Bluetooth channel is initially started (step 1640), and the phone enters a listen mode (step 1642) in which is listens for communication that indicates that it can join a PAN.

When phone enters the PAN, the PANd discovers the cell phone and tries to establish Bluetooth connection (step 1616). If the connection is established, the PANd or an associated SIP user agent (UA) attempts to register the user with the NCG (step 1620). If the registration is successful, the PANd completes the pairing procedure by sending a secure PIN to the cellular application (step 1622), which is received at the phone (step 1644). At this point, the phone is instructed either by the PANd or over the cellular network to power down its cellular radio (step 1646), and calls are delivered to the user via the NCG over a VoIP connection, for example by the phone powering up a WiFi radio and joining the LAN, or alternatively by VoIP packets being passed between the LAN and the phone over the Bluetooth connection. The PANd continues to monitor the Bluetooth connection (step 1624) to detect any loss of connection which is interpreted as the phone leaving the PAN.

When the PANd detects that the Bluetooth connection with the phone has been broken (step 1630), it sends the NCG a registration message so that calls are then routed to the phone over the cellular radio network. When the phone's cell application detects the loss of the Bluetooth connection with the PANd, it powers up its cellular ratio (step 1650) and registers with the cellular network (step 1652).

2.4.3 Cradle/Pad

In another approach, a cradle is dedicated to establishing the location of the mobile telephone. For example, when the user walks to his office, he puts the telephone in a cradle sitting on his desk. The cradle is coupled to the system, for example, by being hooked up through a laptop by a data cable, such as a USB cable, to the access point. The cradle or laptop informs the access point when the phone was plugged into it. The access point then initiates the registration of that telephone over the private domain network.

In one version of this approach, each cradle is dedicated to one phone, so as soon as the access point knows which cradle it is making a connection with it, it is able to know what user has just plugged their equipment in, and is able to create an association with that equipment. This cradle could have other capabilities as well, such as charging the battery of the equipment while it is plugged into the cradle. Alternatively, the cradle identifies the telephone for example by accessing identification information through the electrical connectors of the cradle.

A similar approach makes use of a pressure pad upon which the phone is placed when near a wireless access point. Instead of placing the phone in a cradle, the phone is put on a pressure pad that senses the weight of the phone. As with the cradle, the pressure pad is connected to the system, for example, by being connected through a laptop computer to the access point.

Optionally, the pressure pad could be programmed to only notify the access point if an object within certain weight guidelines is placed on it. Therefore, if something else was inadvertently placed on the pad (some paper, a book, if a cat were to sit on the pad, etc . . . ) the pressure pad would not notify the access point of anything, and the phone would not be registered on the private domain network. The weight of the phone would trigger the pressure pad to signal the access point that the phone has been placed on it. The access point would then register that phone over the private domain network. Each pressure pad would be dedicated to one phone, so as soon as the access point knows which pressure pad it is making a connection with it, it will be able to know what user has just placed their equipment on the pad, and will be able to create an association with that equipment. This pressure pad carries with it benefits of the cradle listed above, but does not require the user to actually plug-in the phone, simply to place the phone down on the pad.

Figure 4:
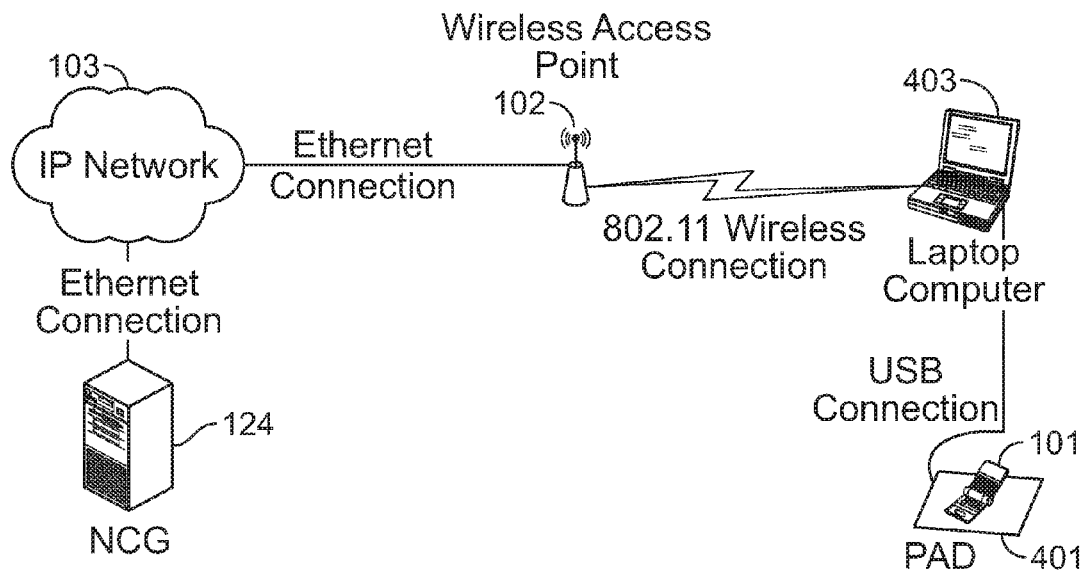
FIG. 4 is a block diagram of a system that includes a pressure pad for detecting a mobile telephone.

Referring to FIG. 4, when a mobile device 101 is placed on a pressure pad 401. The pad communicates through a USB cable to a laptop 403 (the laptop is used as an example only; the pressure pad could be connected to any device capable of making an internet connection). The laptop would in turn communicate to the wireless access point 102 that a mobile device has been placed on the pressure pad. The laptop would also communicate the registration information associated with that pressure pad to the access point. The access point would use that information to inform the NCG 124 through the IP network 103 of the arrival of that user to the private domain network. The NCG would then use that information to route all calls for that user through the private domain network.

2.4.4 Detection of Cellular Transmission

In another approach, a device associated with the WLAN detects the presence of the mobile phone by scanning for the energy emitted by the mobile phone 101 in the macro mobile network frequencies to determine when they are in proximity to each other. The device does not necessarily transmit to the phone directly. Rather once the device detects the phone and determines the phone's identity, it sends a message to the phone over the conventional cellular system, for example, using an SMS message.

In a related approach, a device associated with the WLAN acts as a "pseudo cellular base station" and actively interacts with the mobile phone in the cellphone network frequencies in detecting the phone's presence. Regular cell sites operate on what is called the "forward channel" by transmitting out all of the information that is needed to register a cell phone with that site. The cell phone then transmits back on the "reverse channel" by sending the cell site its phone number, and serial number. Once the cell site receives this information, the phone is registered with that cell site and all calls to and from that phone would be routed through that cell site. In this detection approach, a pseudo cell site transmits "false" registration information at a weak signal level. The pseudo cell site would be placed in or near the wireless access point so that any phone within range of the pseudo cell site would also be within range of the access point. When a phone comes within range of this pseudo cell site, the phone will attempt to register with the site by sending out its registration information. Instead of registering the phone with the cell site, this pseudo cell site will instead register the phone over the private domain network that is attached to the access point. Because the phone is already programmed to send out its registration information when it comes into contact with a cellular base station, no changes would be needed to the phone in order to make this embodiment of the instant invention work.

Figure 5:
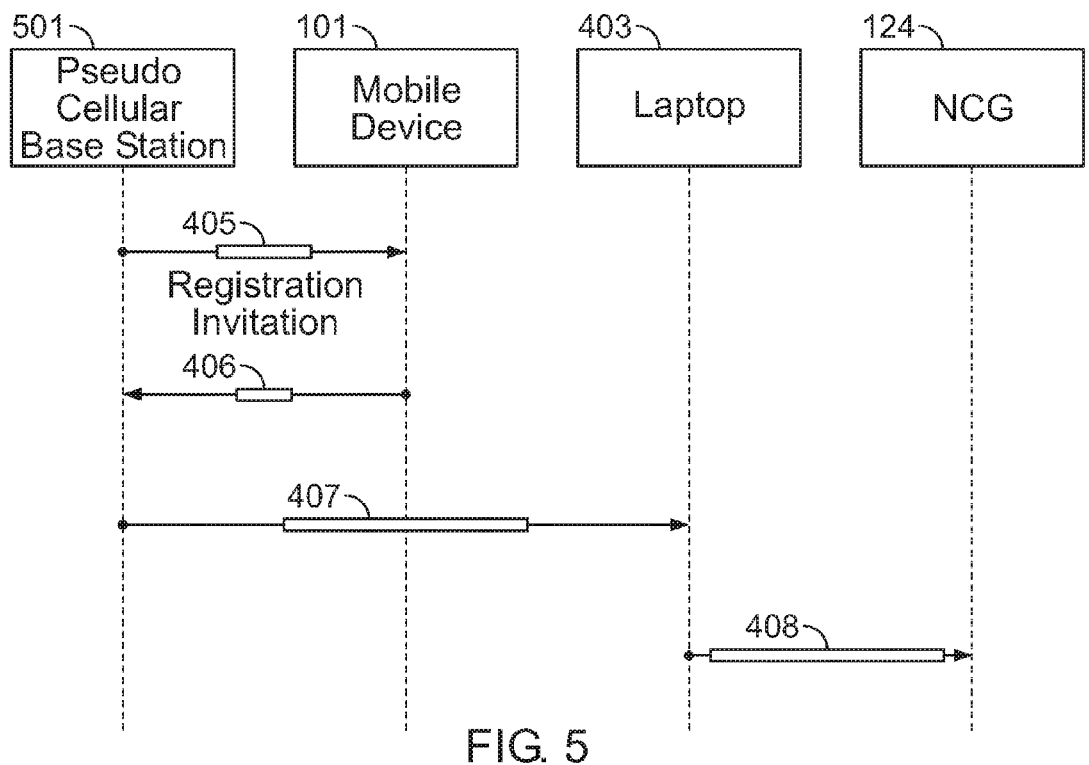
FIG. 5 is a timing diagram for a registration procedure using a pseudo base station.

Referring to FIG. 5, in an example presented with reference to CMDA network signaling, the pseudo base station 501 broadcast out "registration invitations" 405 to any mobile devices within range of the accompanying access point (which would be connected to a laptop 403). A mobile device 101 that enters the range of the base station would transmit back to the base station its registration information 406, including its mobile identification number (MIN) and its electronic serial number (ESN). The base station would then broadcast out the registration information of the mobile device 407 to the laptop 403. The laptop would take that information and broadcast it 408 to the NCG 124. The NCG would use that information to route all calls to that MIN to the appropriate location and device.

2.5 Proximity-Based Call Notification

Figure 15:
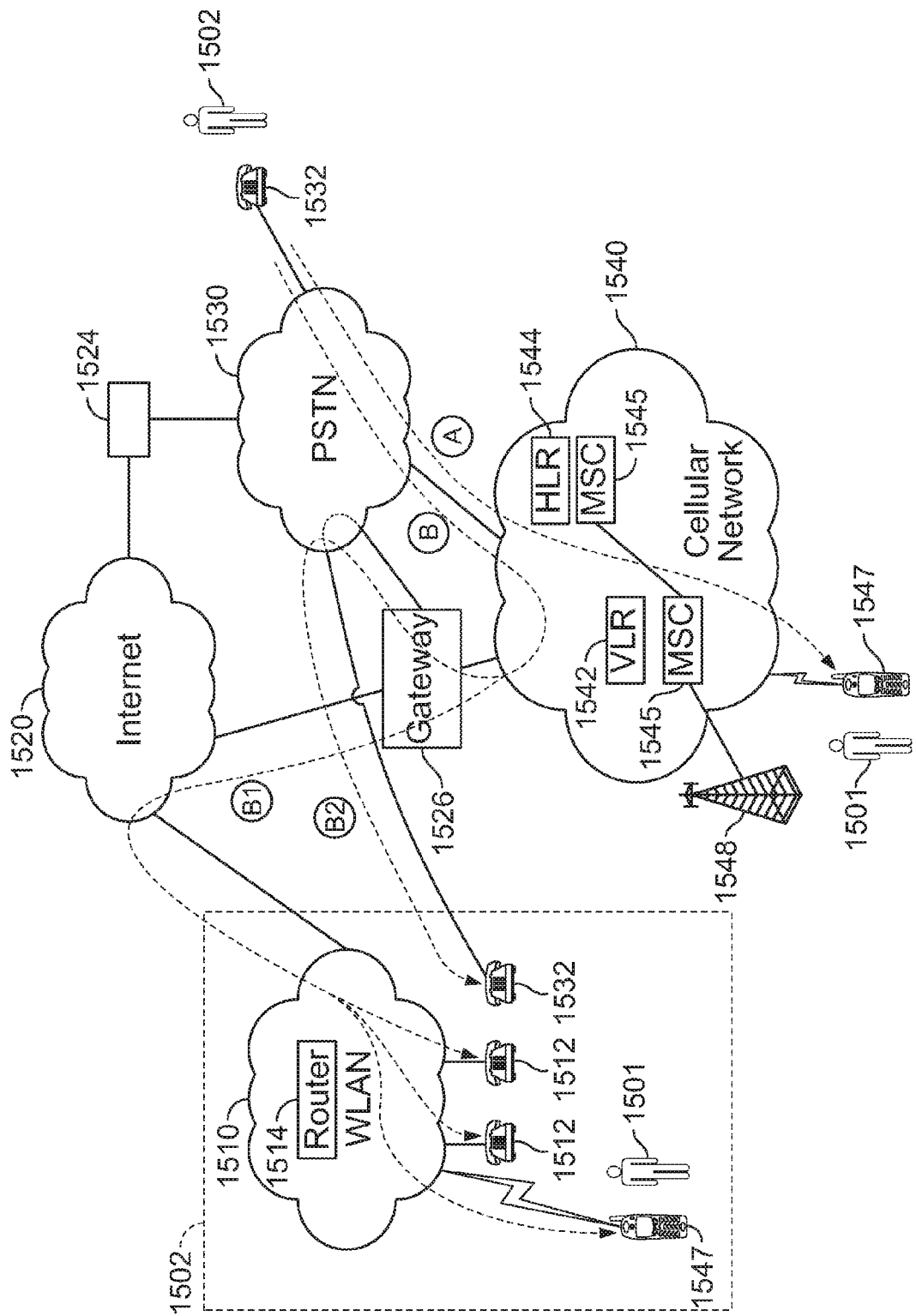
FIG. 15 is a block diagram of a mobile telephone communication system.

Referring to FIG. 15, in a usage example of a version of a communication system that makes use of proximity detection, a mobile user 1501 has a primary telephone number at which he receives calls. In this example, the primary number is the cellular telephone number of the user's mobile telephone. When the user is away from his home or office, calls placed to the user's cellular telephone number ring only on his cellular telephone.

In this example, the user's mobile telephone is a "dual-mode" telephone that also has WiFi communication capabilities. When the user is at his office, the mobile telephone registers on the user's corporate wireless local area network (WLAN). While registered on the corporate WLAN, calls placed to the user's cellular number ring both on the mobile phone and on the user's office desk phone. The mobile phone receives these calls as voice-over-IP (VoIP) calls via the corporate WLAN. The user's desk phone may be a wired circuit switched telephone or may be a VoIP phone.

When the user is at home, the user's dual mode phone registers on the user's home WLAN. When registered on the home WLAN, calls are delivered to the user's home telephones, which may be circuit-switched telephones, or may be VoIP phones, for example, connected to the Internet over a DSL or cable modem connection.

Referring to FIG. 15, a communication system that supports a usage example of the type described above includes a Local Area Network (LAN) with WiFi capability 1510 (also referred to below interchangeably as "WLAN", "LAN", WiFi LAN and "wireless LAN") at a location 1502, such as a user's office building or a user's residence. The LAN 1510 has IP phones 1512 coupled to it, which can receive VoIP calls from the Internet 1520. Traditional VoIP equipment 1524, such as proxy and registrar servers, and other specialized VoIP support is coupled to the Internet 1520. The VoIP equipment 1524 provides a link to the PSTN 1530, for example, enabling a PSTN phone 1532 to call a VoIP phone 1512 on the LAN 1510. The communication network also includes a cellular wireless network 1540, which includes a representative radio base station 1548, which provides radio connectivity to a mobile telephone 1547. The cellular wireless network 1540 includes conventional Mobile Switching Centers (MSCs) 1545, Visitor Location Registers (VLRs) 1542, and Home Location Registers (HLRs) 1544.

A gateway 1526 provides a voice signal and signaling interface between the cellular network 1540 and the Internet 1520 and PSTN 1530. The gateway 1526 enables registration of the user's mobile telephone 1547 on the WLAN and redirection of calls to the cellular network via the WLAN or the PSTN.

The mobile telephone 1547 (also referred to in this section interchangeably as "wireless device", "dual wireless phone", "dual wireless device", "WiFone") has dual capabilities, being capable to access and register in the cellular network 1540 and also establish communication in the WLAN 1510, over which it may access the Internet 1520. The mobile telephone 1547 may be located in a cellular service area, as indicated by the mobile telephone 1547 in proximity to base station 1548, or at a location 20 which is in proximity to the WLAN 1510.

When the mobile telephone 1547 is not in the proximity of the LAN 1510, the mobile telephone 1547 registers with the cellular wireless network 1540 and calls placed to the mobile telephone 1547 are routed via a base stations of the cellular wireless network, such as base station 1548 illustrated in FIG. 15. A wireless protocol such as ANSI-41 may be used by the wireless network components to communicate in order to register, locate and call the moving mobile telephone 1547.

When the mobile telephone 1547, which is a dual mode cellular/WiFi device, arrives in the proximity of the wireless LAN 1510, it senses the signals emitted from a wireless access point on the WLAN. The mobile telephone 1547 then attaches to the LAN, for example obtaining an IP address on the WLAN 1510 from a router 1514, and becomes an active participant in the Internet communication via the WLAN 1510.

Optionally, the mobile telephone 1547 registers with the VoIP equipment 1524. The VoIP equipment 1524 supports, for example, the Session Initiation Protocol (SIP) protocols. The mobile telephone 1547 may contain a SIP agent and register with the SIP registrar located in equipment 1524, making its presence known in the SIP network. After registration, the mobile telephone 1547 may place and receive SIP calls via the SIP proxy server located in the equipment 1524.

The mobile telephone 1547 notifies the gateway 1526 of its presence in the wireless LAN 1510. The gateway 1526 supports special VoIP services for mobile devices, such as the mobile telephone 1547. The gateway 1526 communicates using SIP or similar protocols over the Internet 1520 and is also capable of communicating with the components of the cellular wireless network 1540 via a wireless protocol, such as ANSI-41.

In one embodiment, when the mobile telephone 1547 registers with the gateway 1526, the gateway acts as a VLR in the cellular network and contacts the HLR 1544 associated with the mobile telephone 1547. When the telephone 1547 registers with the gateway 1526, it indicates its location 1502 or the gateway otherwise infers the location 1502 of the mobile telephone 1547, for example, according to an Internet Protocol (IP) address used by the telephone. The gateway 1526 causes the HLR 1544 to update its location information for the user to indicate that the user is at location 1502. This way, the mobile telephone 1547 is registered in the cellular wireless network 1540 while attached via the WLAN 1510. At this point, both the gateway 1526 and the HLR 1544 know that the telephone 1547 is located in the proximity of the WLAN 1510 and it can be reached via the gateway 1526. The gateway 1526 connects and mediates cellular telephone circuits to wireless VoIP streams. Thus, when the mobile phone is registered on the WLAN, a wireless call to the mobile telephone 1547 is routed via the gateway 1526, converted to VoIP streams and routed over the Internet and the WLAN 1510 to the mobile telephone 1547.

In another embodiment, the gateway 1526 mediates SIP signaling messages from the mobile telephone 1547 on the WLAN 1510 and acts as a proxy device in the wireless network. The HLR directs a wireless call for the telephone 1547 to the gateway 1526 which acts as a wireless proxy for the mobile telephone 1547. When the gateway 1526 receives a call destined to the mobile telephone 1547, it takes the responsibility of routing the call to the telephone 1547 over the Internet 1520 and WLAN 1510, based on the registration information received from the mobile telephone 1547.

Regardless of the role played by the gateway 1526, after the mobile telephone 1547 attaches to the WLAN 1510 and registers with the gateway, the gateway and possibly the HLR 1544 know where the mobile telephone 1547 is located. The gateway and/or the HLR or other platform associated with the routing of incoming calls (e.g. a Service Control Point (SCP) with an Intelligent Network (IN) application that supports CAMEL in a GSM network or WIN in a CDMA network) thereby know which group of associated phones should also receive notifications of calls to the user's mobile telephone. The mobile telephone 1547 may insert explicit location information in a REGISTER SIP message it sends to the gateway 1526. The location information may be a routable IP address that identifies how to access the WLAN 1510, or it may be the host name of the access router that can be resolved to an IP address. Even an explicit text extension in the REGISTER message, identifying the location, for example, "home", or "office" or "cottage", may serve a further explained purpose. If the mobile telephone 1547 does not insert explicit location information in a REGISTER message, the gateway 1526 may infer the location by examining the source IP address of the messages it receives form the device. In this case, what is located is a subnet such the WLAN 1510. The telephone 1547 is physically located well if the WLAN 1540 is a home network and relatively geographically compact. If the WLAN 1510 is a subnet in an enterprise network, the gateway may simply infer that the user of the telephone 1547 is somewhere in the enterprise building.

The user of the telephone 1547 may have wired VoIP phones 1512 attached in the WLAN 1510. These phones may be configured to register as they are powered on with the gateway 1526. Alternatively, the gateway is configured to be aware of the phones, for example, through subscribing to a telephone service. The gateway 1526 maintains a data base that contains information about the registered devices for a user associated with a particular location, such as on the same subnet corresponding to the WLAN 1510. Regular POTS phones 1532 may also be registered in the gateway 1526 data base for the user's location. Devices such as wireline VoIP phones 1512 and POTS phones may be statically associated within the same group. The gateway 1526 analyzes the registration messages from devices that register dynamically, such as the mobile telephone 1547 or VoIP phones 1512. A dynamically registered device may be associated with a group if it is located in the same IP subnet, or respond to the same phone number as the members of existing groups, generally belonging to the same user. In the case of SIP, the REGISTER message may include a text extension, as mentioned earlier, that describes explicitly a group, such as "home", to which the registering device should be associated.

The gateway 1526 may register all the devices in a group with the HLR 1544 in the cellular network 1540. Thus the HLR 1544 may also maintain information about the some or all of the associated devices of the same group that are configured to respond to the same phone number, but would not typically maintain information about any POTS phones in the group.

The gateway 1526, the HLR 1544 and/or an IN application maintain user profiles. The user profile may indicate how to treat incoming calls destined to devices that are associated with other devices in a group. For example, the user of the mobile telephone 1547 may have a user profile that specifies that when a call is received for the mobile telephone 1547 when it is located in the same WLAN 1510 with the other VoIP phones 1512, the call should be placed to the mobile telephone 1547 as well as to the phones 1512. Alternatively, the user profile may specify to call only the wireline VoIP phones associated with the mobile telephone 1547. Alternatively, the user profile may specify to call all the phones, including the POTS phones, or only the POTS phones associated with the mobile telephone 1547 in a certain group. Thus, for example, a user may choose to be called on the wireline VoIP phones when at home, on the POTS phones when in the office and on the mobile telephone 1547 itself when on the road.

In one exemplary embodiment, when a call is received in the wireless network 1540 for the user's mobile telephone 1547, if the user's telephone present on the cellular network, the call is passed through the cellular network directly to the telephone (path A in FIG. 1). If the user's telephone is registered with the gateway, the HLR 1544 forwards the call to the gateway 1526 that acts like a wireless proxy device (path B). The gateway 1526 recognizes the registered telephone 1547, retrieves its group associations and forks the call to the associated devices according to the specifications in the user profile. In this case the gateway 1526 connects wireless circuits to the corresponding VoIP streams (path B1) and/or to any POTS telephones in the group (path B2).

In another embodiment, when a call is received in the wireless network 1540 for the user's mobile telephone 1547, the Gateway MSC and or HLR interact with an IN application which directs the gateway MSC to fork the call to the associated devices according to the user profile, over the PSTN or over the Internet via gateway 1526. The IN application interacts with the gateway 1526 to determine the appropriate routing for the incoming call, for example, based on the registration status and location of the mobile telephone 1547.

In another embodiment the association between the user's mobile telephone 1547 and the VoIP phones 1512 is established in the LAN 1510. An IP PBX function in the local router maintains a local list of VoIP phones attached to the LAN 1510. As the telephone 1547 is added to the list, the IP PBX may register the user with gateway 1526. Calls to the user are sent from the gateway 1526 to the IP PBX, which then directs the call destined to the telephone 1547 to all the VoIP phones on the LAN 1510 that is associated with the telephone 1547.

In another embodiment a broadband service provider may manage the VoIP connections in the access network. In this case the telephone 1547 registers its presence in the LAN 1510 with the VoIP provider of the other VoIP phones 1512. When a VoIP call is received that is destined for the telephone 1547, the service provider may alert all the VoIP phones registered in the LAN 1510.

When any of the associated devices that are alerted, either the telephone 1547, or the VoIP phones 1512, or the associated POTS phone answers the call, a voice circuit is established to the answering device. If the called telephone 1547 is busy, the other associated devices are not alerted. Alternately if telephone 1547 is busy the other associated devices may still be alerted. When a call is received for the telephone 1547, alerting the VoIP phones 1512 may be done with distinct ring tones.

When the mobile telephone 1547 leaves the proximity of the WiFi LAN 1510, the registration with the wireless operator via the wireless LAN expires. In an exemplary implementation the mobile telephone 1547 may sense that it looses the connection with the router 1514 and may deregister by signaling directly to the wireless network via a base station 1548.

In the description above, the mobile telephone 1547 is a dual mode telephone which can support telephone voice communication via either one of its cellular telephone or its WiFi interface. Optionally, the telephone may have WiFi capabilities but may not necessarily be able to support VoIP telephone voice communication. One alternative in such a scenario is for the telephone 1547 to register on the WLAN and inform the gateway 1526 of its presence. The gateway identifies the associated telephones for the location of the WLAN as described above. However, in this situation, calls are sent to the other VoIP phones on the WLAN, but not to the telephone 1547 over the WLAN. Optionally, in such a scenario, the telephone 1547 may be notified of the call over the cellular network while the associated phones are notified over VoIP or POTS connections.

2.6 Detecting Imminent Exit from the IP Domain

The discussion above in general focuses on the detection of an arrival of a mobile telephone to the proximity of a candidate WLAN so that the phone can roam into the IP domain and/or have active calls handed off to the IP domain. As a phone leaves proximity of an access point, the reverse re-selection or handoff is initiated.

One approach to detection of imminent exit from the WLAN is based on the WLAN signal strength. In a simple version of this approach, when the WLAN signal is lost, the phone re-registers in the cellular domain. Due to the time required for this re-registration, handoff of active calls may be difficult or impossible with this simple approach. Alternatively, a decline in the WLAN signal strength is used to predict an imminent exit from the WLAN. The threshold at which this decline triggers the transition can be fixed, or can be WLAN specific. WLAN-specific thresholds can be based on prior measurements during prior exits from the WLAN. For example, the signal level in a hallway leading to an entrance to a location can be used to set the threshold.

Reverse versions of a number of the detection approaches described above can also be used. For example, a user command can initiate a transition back to the cellular domain. Similarly, location detection by the system (e.g., using RFIDs) or by the phone (e.g., GPS) can be used to trigger the transition to the cellular domain. In the pressure pad and cradle approaches, removal of the phone from the pad or cradle can trigger a transition back to the cellular domain.

3 Registration Procedures 3.1 Registering in the IP Domain

When a mobile phone activates its WiFi transceiver to potential registration in the IP domain, it goes through a number of phases including detecting a suitable access point, joining the WLAN, and the registering with the system to roam to the IP domain. After it registers in the IP domain, it generally powers down its cellular transceiver for the duration of its service with the IP domain.

3.1.1 Acquisition of WiFi Extended Service Set

When using the continuous monitoring approach to detecting proximity to a candidate WLAN, the phone operates in a passive scanning mode. When using approaches in which the phone is commanded to attempt to join a particular WLAN, the phone operates in an active scanning mode in which it attempts to join a WLAN with a specified Service Set Identifier (SSID) parameter.

To become a member of a particular WLAN (or more precisely to become a member of an Extended Service Set (ESS), which is made up of a number of Basic Service Sets (BSS) each of which includes an access points coupled to the wired IP network) using passive scanning, a WiFone scans for beacon frames containing that ESS's SSID. To actively scan, the WiFone transmits Probe frames containing the desired SSID.

If the WiFone determines that it is unlikely to find a BSS with the desired SSID within a threshold time interval, for example within 100 milliseconds, the WiFone retries after a delay, for example, of 2000 milliseconds, and then declares a failure to detect the WLAN.

3.1.2 Obtaining IP Address

Once the WiFone has created an association with an access point, it performs the following steps to obtain an IP address:

1. Broadcast dhcpdiscover, including the WiFone MAC address and name

Figure 6:
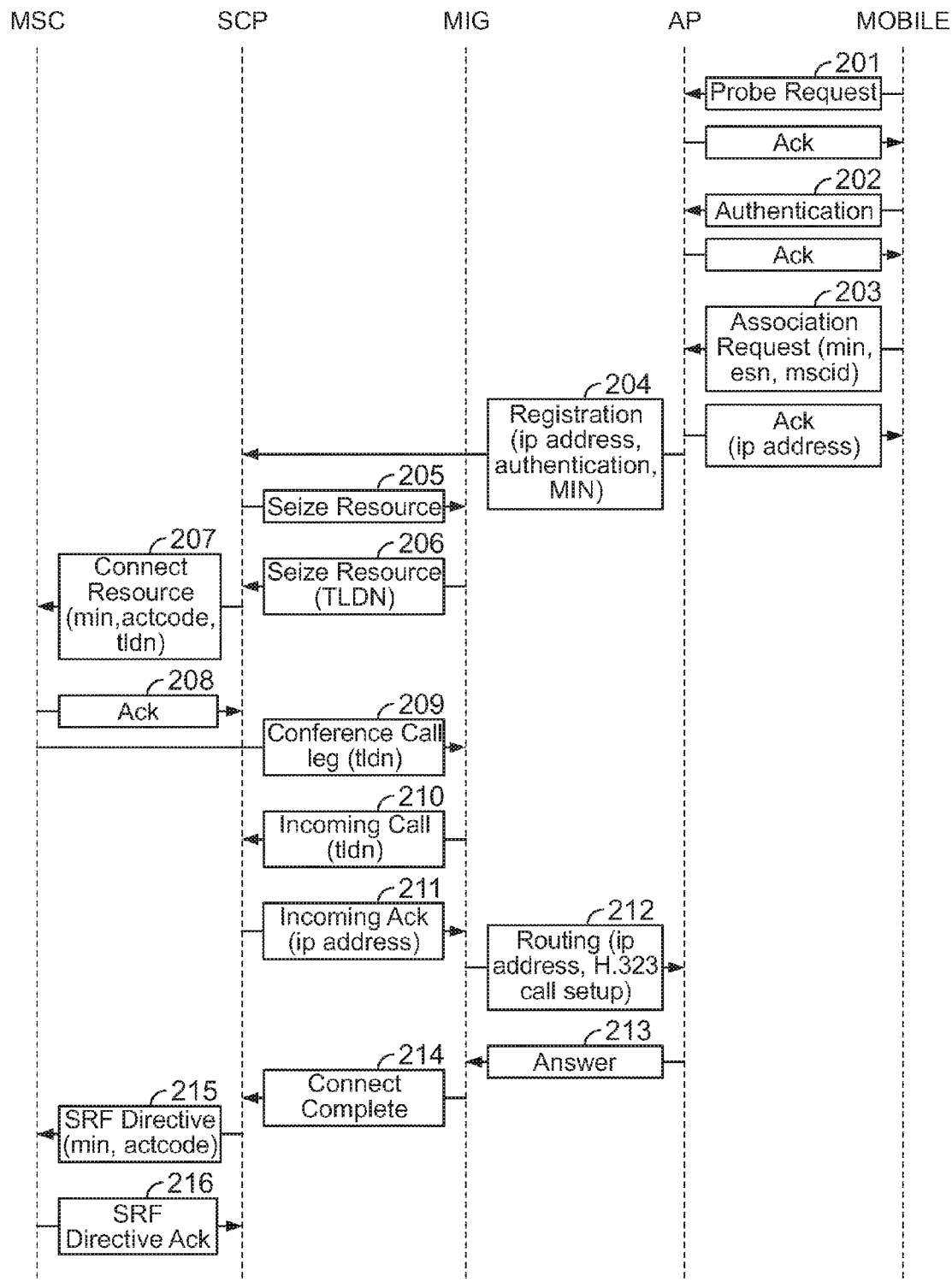
FIG. 6 is a flowchart illustrating call hand-off at registration within a private domain.

2. Receive dhcpoffer from a server, record the offered IP address and length of lease. WiFone ignores all other offers 3. Broadcast dhcprequest to all DHCP servers that made offer, including the accepted server address and the offered IP address 4. Receive dhcpack and store the IP address. Report the IP address and length of lease to the NCG at registration Referring to FIG. 6, in an example presented with reference to signaling in a CMDA network, the mobile telephone is programmed to respond only to an access point with a designated identification. If the identification is correct, the mobile telephone establishes a communication link to the Access Point. In step 202, the Access Point identifies and authenticates the specific wireless telephone to ensure that the telephone is one that the access point is authorized to connect to. In step 203, the telephone indicates to the access point its mobile identification number (MIN) and the Electronic Serial Number (ESN), as well as, if there is a call in-progress, the serving cell site and sector. A processor within the access point or a processor in a computer to which the access point is connected compares the reported MIN and ESN to recorded data stored in the access point. If they match, the authentication requirement is satisfied. The access point also sets up the appropriate operational data that can be used for the duration of the session after hand-off. In step 204, the access point reports to the SCP all of the data required for a hand-off of the call, including IP address, MIN, and ESN.

The SCP retrieves the subscriber's profile database for the identified wireless telephone from the subscriber's HLR (not shown in FIG. 6), thereby obtaining information on the capabilities and permitted activities of the subscriber and the access point. Given the capabilities of the serving private domain and the features set in the subscriber's profile, the SCP stores this information in its Visitor Location Register (VLR) (not shown in FIG. 6), which is a temporary subscriber database created just for the duration of this session. At this point, Registration is complete and phone is awaiting the call hand-off attempt.

3.1.3 Registration Process

Registration is the process by which the WiFone notifies the NCG 124 of its location, status, identification and other characteristics. The WiFone informs the NCG 124 of its location and status so that the NCG can invite the WiFone when establishing a terminated call or data message. The WiFone supplies the protocol revision number so that the NCG knows the capabilities of the WiFone.

The NCG supports a number of different forms of registration, including:

1. Reselection registration. The WiFone registers when it switches from using a cellular frequency.
2. Power-down registration. The WiFone registers when it powers off if previously registered with the NCG.
3. Timer-based registration. The WiFone registers when a timer expires.
4. Ordered registration. The WiFone registers when the NCG requests it.

The first three forms of registration are called autonomous registration and are enabled by the NCG at registration. Ordered registration is initiated by the NCG through a SIP Info method.

Any of the forms of autonomous registration and can be enabled or disabled. The forms of registration that are enabled and the corresponding registration parameters are communicated in the SIP Register method and the SIP Info method.

Reselection registration is performed when the WiFone selects the WiFi mode from the cellular mode. To prevent multiple registrations when the signal strength of the WiFi Zone fluctuates, the WiFone delays 300 m seconds before registering with the NCG after entering the WiFone Idle State.

The WiFone maintains an initialization timer. While the initialization timer is active, the WiFone does not make registration access attempts to the cellular base station.

Power-down registration is performed when the subscriber or system directs the WLAN interface of the WiFone to power off. If power-down registration is performed, the WiFone does not power off until after completing the registration attempt.

Timer-based registration causes the WiFone to register at regular intervals. This type of registration allows the NCG to automatically de-register WiFones that did not perform a successful power-down registration. Timer-based registration is performed when a counter reaches a maximum value that is controlled by the NCG via the Periodic Registration field of the SIP Register method. The NCG disables timer-based registration by setting Periodic Registration to zero.

The WiFone maintains a timer-based registration counter. The WiFone maintains an indicator of timer-based registration timer enable status. The counter is reset when the WiFone powers on and when the WiFone switches from different serving systems. The counter is also reset after each successful registration.

The NCG can command the WiFone to register by sending a Registration Request parameter in a SIP Info method.

Figure 7:
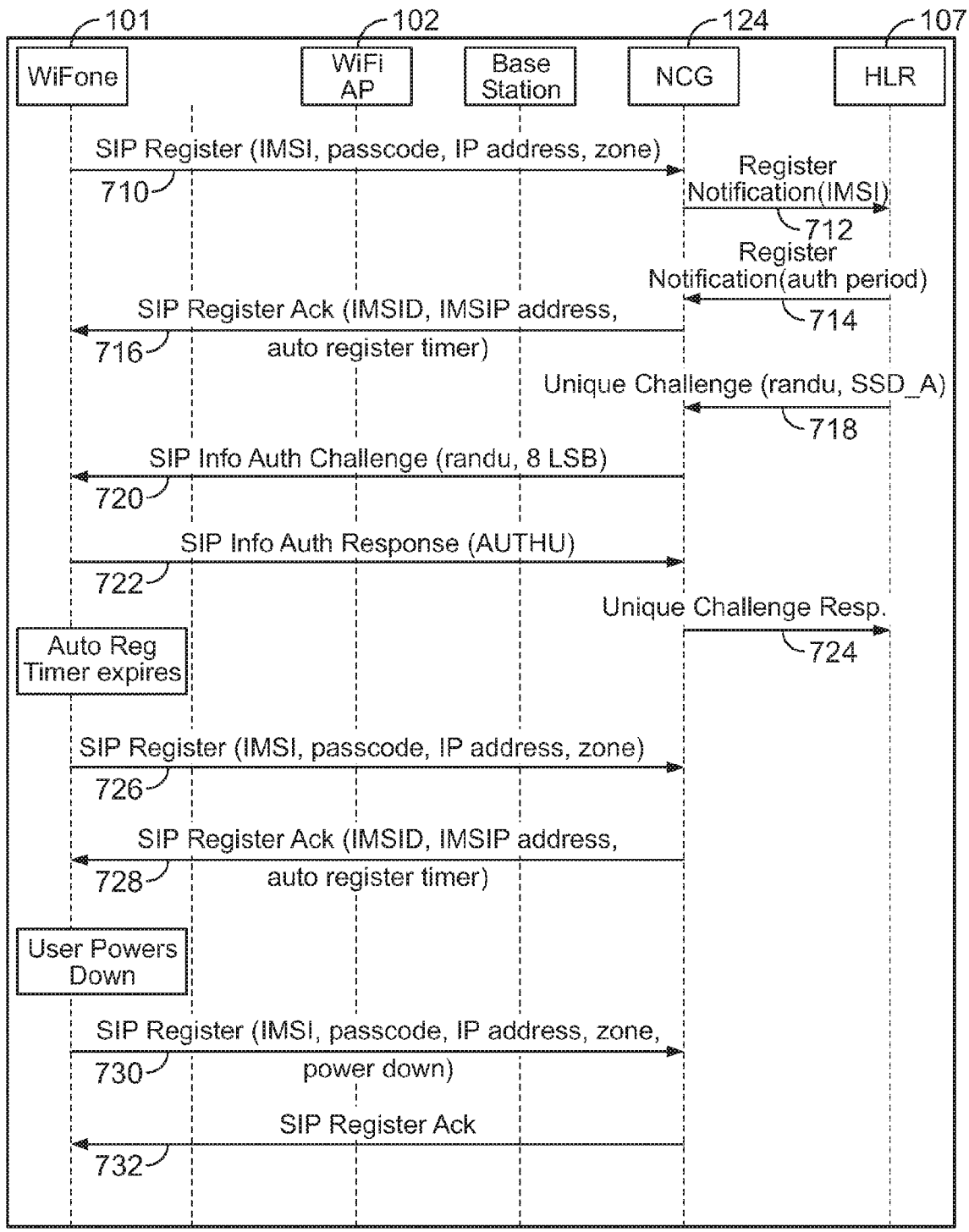
FIG. 7 is a timing diagram of a registration procedure.

Referring to FIG. 7, upon reselection to the WiFi access point, the WiFone performs the following actions in order to prepare to initiate or receive VoIP calls. The WiFone retrieves the domain name for the NCG from a storage in the WiFone and launches a SIP Registration 710 method with the NCG. The NCG registers the WiFone 712 with the phone's HLR using conventional wireless network signaling and receives an acknowledgement of the registration 714. The WiFone then receives the SIP Register Return Result 716 when the WiFone is considered registered with the NCG.

While the phone is active in the IP domain, the system emulates the behavior of the phone as if it had remained within the cellular domain. For example, in a CMDA network, the HLR periodically, sends the NCG a Unique Challenge for the phone 718, in the same manner that it would have sent the Challenge to a VLR associated with a handling MSC. Because the phone is active in the IP domain, the NCG computes a response to the challenge using information that it retrieves from the phone using SIP-based procedures. Specifically, a Unique Challenge Response Procedure is initiated by the NCG. The NCG generate the 24-bit quantity Randu and sends it to the WiFone in the SIP Info method 720. Upon receipt of the Info method, the WiFone fills the 24 most significant bits of the Rand Challenge input parameter with Randu, and fills the eight least significant bits of Rand Challenge with the eight least significant bits of IMSI. The WiFone then executes the Auth Signature procedure. The WiFone fills the Authu field with the 18-bit output Auth Signature in the Info method reply 722, which it sends to the NCG. The NCG then computes the value of Authu in the same manner as the WiFone, but using its internally stored value of SSD_A. The NCG compares its computed value of Authu to the value received from the WiFone. If the comparison fails, the NCG may deny further access attempts by the WiFone, drop the call in progress, or initiate the process of updating the SSD. A similar aproach is applicable in GSM networks.

When a Periodic Registration timer expires, the WiFone invokes a SIP register method 726 to the serving NCG that includes IMSI, passcode, current IP address and WiFi zone. Upon acknowledgment from the NCG 728, the WiFone resets the Periodic Registration timer according to the received value in the acknowledgment.

Upon successful registration with the NCG, the WiFone instructs its cellular radio to power down. This completes the reselection to the IP domain.

3.2 Dual Registration

As discussed above, it is desirable, for example, for power considerations, to only maintain a single one of the cellular and WiFi transceivers active on the phone at one time. There may be times when it is desirable or necessary for both transceivers to be active.

During the time a mobile device is powered on, the device will periodically re-register with the cellular network. The same sequence happens if the phone is registered with a WLAN. When a dual mode device roams into a WLAN from a cellular radio network, the device will initiate a registration procedure via a wireless network access point using Session Initiated Protocol (SIP) to the NCG. The NCG then converts this into a cellular registration to notify the HLR of the device's location. This allows the HLR to update the position of the device for call delivery and other services.

However, if the cellular radio of the device remains powered on, it will periodically continue to register via the cellular radio network, while the WLAN interface will also continue to attempt to periodically register via the WLAN network. This can result in thrashing of registrations between the WLAN network and the cellular radio network.

There are two possible problems with the thrashing of the two registrations. The first problem may be an increase in the message load on the system. The system may be bombarded with registration messages from both the WLAN network and the cellular network, which produces an overload on the system. The second problem is poor service quality that may result from an unpredictable call delivery path.

In conventional cellular mobility management, when a phone enters the region served by a new MSC served by a new VLR different from the phone's current VLR, the new MSC detects the presence of the phone, for example, by the phone making a registration request. Generally, the new VLR informs the phone's HLR of the phone's presence and the HLR handles the cancellation of the phones registration with the current VLR and confirms the registration in the new VLR. In order to prevent registration in with a new MSC in which the phone has a lower signal strength than with the current VLR, a signal strength parameter is passed to the HLR. If the new signal strength is inferior to the current signal strength, the HLR can refuse the registration in the new VLR. If there is an active call, after registration in the new VLR, an inter-system handoff is carried out between the MSCs.

In the dual mode situation, the phone's HLR is similarly faced with registration requests both from the VLR of the NCG as well as from the VLR of a cellular MSC. As in the conventional cellular case, the HLR may make a decision regarding acceptance or rejection of the registration based on the reported signal strengths by the two VLRs, one associated with the WLAN connection through the NCG and one associated with the cellular MSC.

The NCG sends to the HLR spoofed cellular radio signal quality measurements and control channel data. The spoofed signal quality is preferably higher (superior) to that which is reported through the cellular MSC to the HLR. In this way, even though the HLR will in general receive registration requests from the cellular MSC, it will refuse these requests in favor or maintaining the registration in the VLR associated with the WLAN.

The NCG learns the signal quality available from the cellular MSC by first requesting registration with a relatively low signal quality value. The HLR will deny registration (assuming that the phone is still registered in a cellular VLR) and send the NCG the control channel data and the signal quality data in its denial of registration. The NCG takes the received signal quality data and generate higher values. The NCG then sends another registration to the HLR with these higher signal quality values. The HLR compare the values with those it currently has over the cellular network. Assuming the cellular values have not improved significantly between attempts, the HLR will register the phone through the NCG because of its perceived higher values.

The next time the HLR receives a registration request from the cellular network the HLR compares the signal quality measurements between the current registration on the NCG's "pseudo cellular" network and the macro cellular network, and will believe the NCG is offering a higher signal quality. As a result, the HLR will override the cellular registration request and deny the registration. This will reduce or eliminate the thrashing between the cellular and WLAN signals.

When the device leaves the WLAN coverage area, in the most likely scenario the NCG will detect this via registration timeout, or possibly through some manual de-registration procedure initiated by the device, and initiates the "Registration Cancellation" procedure to the HLR. This will in turn remove the spoofed signal quality data from the HLR database. Once the spoofed signal quality is removed from the HLR database, the HLR will stop denying the cellular registration requests, and the device will again register on the cellular radio network.

Figure 8:
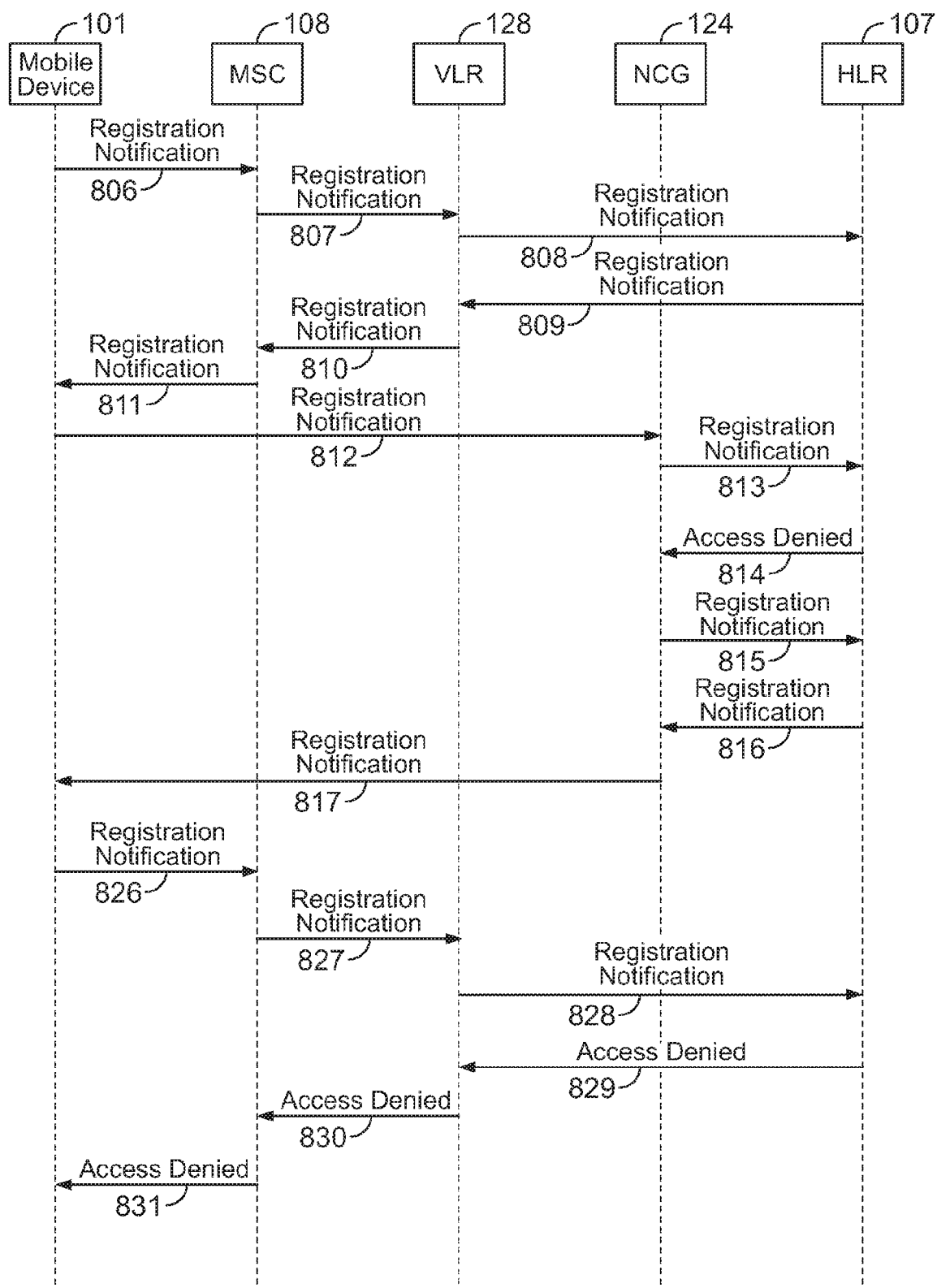
FIG. 8 is a timing diagram of a signal strength spoofing procedure.

FIG. 8 illustrates how the NCG 124 spoofs the signal quality data that is sends to the HLR 107. In each of the registration notification messages, the information contained is signal strength, control channel data and system accounting data. The mobile device 101 sends a registration notification 806 to the cellular Mobile Switching Center (MSC) 108. The MSC in turn sends a registration notification 807 to the Visitor Location Register (VLR) 128 to notify the VLR that a new mobile device has registered on the system. The VLR then sends a message 808 to the Home Location Register (HLR) 107 to notify the HLR of the location of the mobile device. The HLR then sends back a message 809 to the VLR acknowledging the receipt of the registration notification. The VLR then sends this acknowledgment 810 on to the MSC, which then relays it on 811 to the mobile device. When the mobile device then comes within the range of a wireless access point, it will attempt to register over the wireless network through the NCG. To do this the mobile device will send a registration notification message 812 to the NCG 124. The NCG will then signal to the HLR the new location of the mobile device. The HLR will then check the signal quality data sent to it by the NCG. The HLR will then send back a denial of registration message 813 to the NCG. This message will contain the signal quality information from the cellular network that is stored in the HLR. The NCG will then generate a higher signal quality and send another registration notification 815 to the HLR on behalf of the same mobile device. Because this registration notification will contain higher signal quality values than what is being offered by the cellular network, the HLR will cancel the registration over the cellular network, and send back an acknowledgement of the registration to the NCG. The NCG will then send a message 817 back to the mobile device that it is now registered over the WLAN.

Referring still to FIG. 8, the HLR restricts multiple registrations while the mobile device is registered on a WLAN. In each of the registration notification messages, the information contained is signal strength, control channel data and system accounting data. When the mobile device 101 registers with the NCG 124, the NCG sends its spoofed signal quality data 814 to the HLR 107, which stores that data. The mobile device would then attempt to register on the macro cellular network by sending its registration information 826 to the MSC 108. The MSC would relay the information 827 to the VLR 128, which in turn attempts to register 828 the device with the HLR. The HLR would compare the signal strength data that the MSC is offering with the signal strength that the NCG provided earlier. The NCG signal strength would be higher, and as a result, the HLR would deny registration 829 to the VLR. The VLR would send the denial 830 to the MSC, which would then send the denial 831 to the mobile device. The phone would then stay registered on WLAN without any interference from the macro cellular network.

In the most common WLAN de-registration scenario, when the mobile device leaves the range of the WLAN, the NCG would stop receiving registration requests from the device and would assume the phone had left the WLAN. De-registration can also occur if the user manually de-registered from the WLAN by giving a de-registration command, by the user giving some other command that would de-register the device, or the system automatically detecting the departure or imminent departure of the phone from the proximity of the access point of the WLAN. The NCG would then send a registration cancellation message to the HLR notifying the HLR that the mobile device is no longer registered through the WLAN. The HLR would send an acknowledgement of the cancellation back to the NCG. The HLR would then delete all information regarding that mobile device being registered on the WLAN, including the signal strength data. This would free up the mobile device to register on the macro cellular network.

4 Call Setup in the IP Domain 4.1 Receiving Calls in the IP Domain

Once the subscriber's SCP 104 has received the current configuration data for the subscriber unit 101 from the HLR, then the SCP 104 can connect the subscriber unit 101 to called parties through low power radio to the access point, then via packet-based methods through the IP network 103 to the Mobile to Internet Gateway 105, and then via circuit-based methods to the PSTN (not shown in FIG. 1). Also, the SCP 104 can instruct the MSC 108 to route incoming calls from the MSC to the subscriber unit 101 via circuit-based methods as far as the MIG 105 and then via packet-based methods through the Internet and the private network to the access point which is in low power radio communications with the subscriber unit.

When a call is initiated from a number in the PSTN to the subscriber unit 101, the originating switch requests the HLR 107 to provide routing instructions for the call. As part of the call setup, the HLR 107 determines that the subscriber unit 101 is associated with locator services in the SCP 104. Accordingly, the HLR 107 commands the SCP 104 to provide routing instructions. The SCP 104 determines that the subscriber unit 101 is currently registered in an IP domain and returns routing information to the HLR 107. The HLR 107 returns the routing information to the originating switch. The originating switch establishes the call to the MIG 105. The SCP 104 commands the MIG 105 to route the call via the IP network 103 to the subscriber unit 101 via the access point 102.

Figure 9:
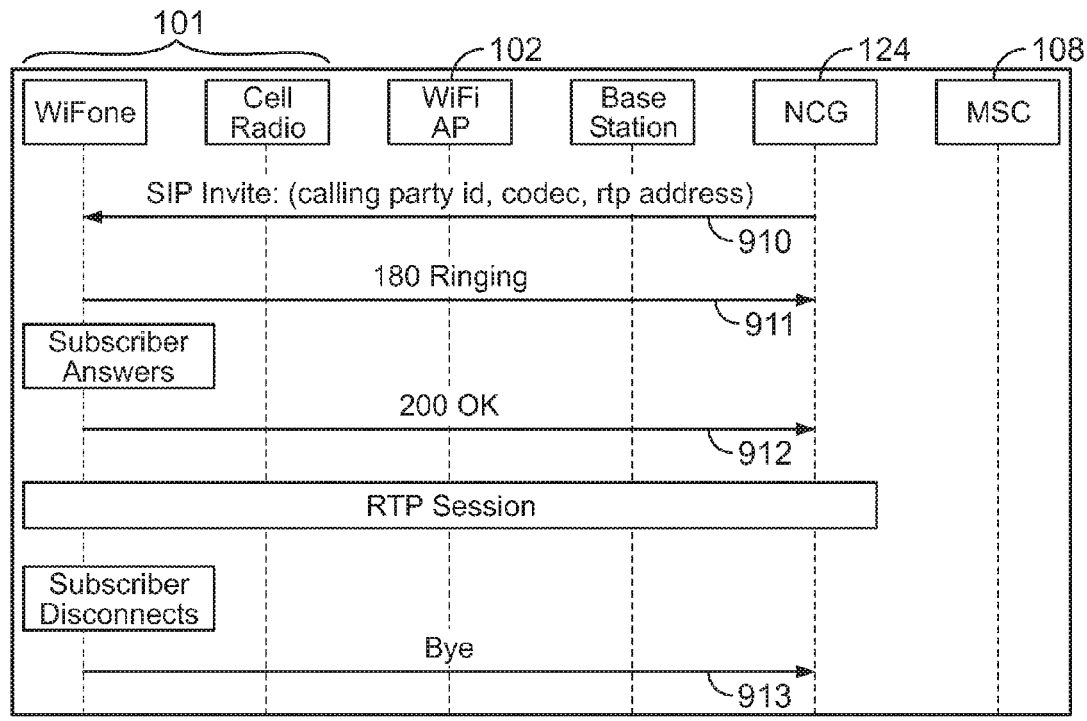
FIG. 9 is a timing diagram of a call delivery to the IP domain.

Referring to FIG. 9, the MIG 105 of the NCG 124 sends a SIP invite 910 to the phone via the WLAN. Upon receipt of a SIP invite, the WiFone compares the calling party ID to an internally stored list of calling party names. If a match is found, the WiFone displays to the subscriber the calling party name. If no match, the WiFone displays the calling party number. If the Invite's calling party id field is empty, the WiFone may display "NoID" or "Unknown".

If the WiFone matches the calling party ID with a name, the WiFone attempts to match the calling party name in a Distinctive Ringing Table. If the WiFone finds a match, the WiFone shall alert the subscriber using the Distinctive Ringing pattern. If no match is found, the WiFone may alert using the default ringing pattern.

The WiFone then alerts the subscriber and returns a SIP 180 Ringing message 911 to the NCG. The WiFone starts a ringing timer (default 20 seconds.) If the ringing timer expires, the WiFone returns a 302 Redirection (not shown in FIG. 9) with a reason code set to no answer. The WiFone stores the calling party name, number or NoID in the Call History file with a time stamp.

When the subscriber answers, the WiFone returns 200 OK 912 to the NCG and connect to the IP address defined by the Invite for the RTP session. The WiFone use the codec defined in the Invite. The WiFone establishes the RTP session.

During the session, the WiFone monitors the signal strength of the WiFi access point or otherwise detects or listens for instructions from the system to affect a handoff from the IP domain to the cellular domain.

When the WiFone detects the subscriber disconnects, it shall send a Bye message 913 to the NCG with a reason code for the disconnect (subscriber initiated, signal failure, dropped call, etc.) The WiFone places an entry in the call history log that includes the calling party, the call start and stop time, call duration and reason code for termination. The WiFone makes the call history log available to subscriber.

4.2 Initiating Calls from the IP Domain

Figure 10:
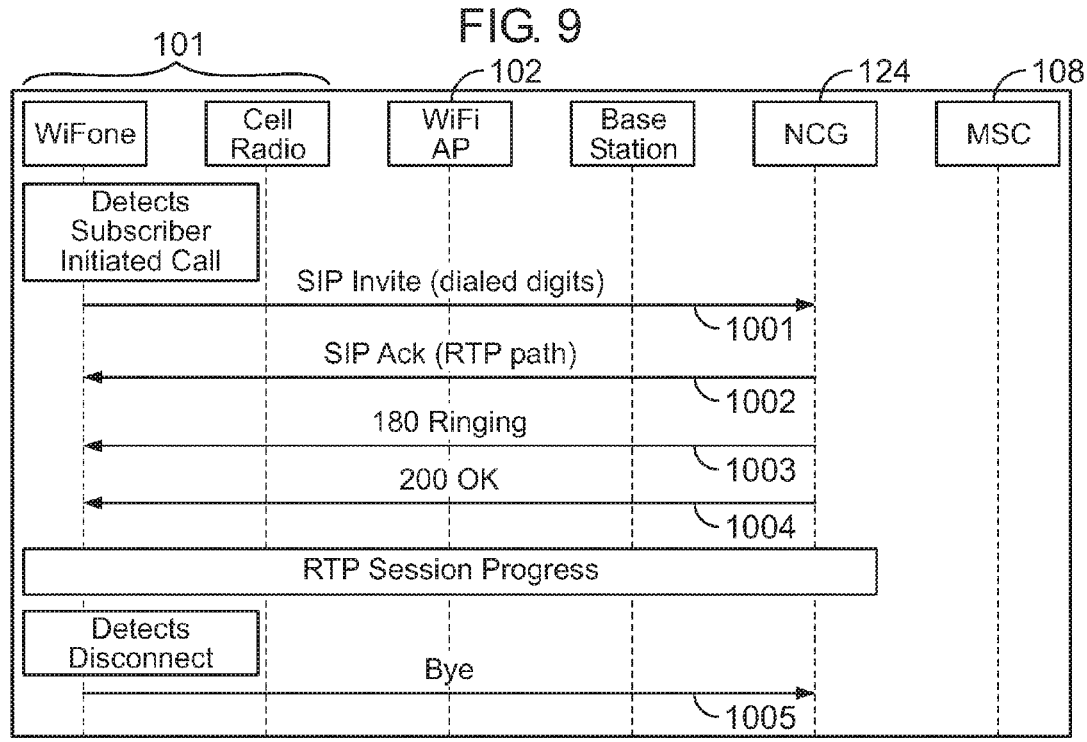
FIG. 10 is a timing diagram of call origination from the IP domain.

Referring to FIG. 10, call origination from the IP domain involves a series of communications between the mobile phone 101 and the NCG 124. The WiFone first detects that the subscriber has initiated a call origination. The WiFone launches a SIP Invite 1001 that contains the WiFone identity and the dialed digits. The WiFone enters the dialed digits into the Call History file. The MIG 105 receives the SIP invite, determines that the subscriber has an origination trigger enabled, and sends an origination request command to the SCP 104. The SCP performs a database lookup of the dialed number resulting in a translated telephone number that can be routed over the PSTN. The SCP 104 responds to the origination request from the MIG 105 with the translated number. The MIG seizes an outgoing trunk that is associated with PSTN and dials the translated digits. The MIG returns a SIP acknowledgment that describes the RTP path and negotiates the codec for the session. The WiFone shall set up the RTP path to the IP address assigned in the SIP Ack. The MIG processes the outgoing call and returns 180 Ringing 1003. The WiFone opens the RTP path for progression tones. When the called party answers, the MIG launches 200 OK 1004 to the WiFone. The WiFone processes the RTP session until it detects disconnect. After the call disconnects, the WiFone launches the SIP method Bye 1005. Conversely, if the NCG detects disconnect on the distant end, the WiFone process the Bye message sent by the NCG, display a disconnect message to the subscriber and return to an idle state.

5 Handoff Procedures

The system also supports "hard" handoffs of established telephone calls between the IP domain and the cellular domain. For example, a call initiated from the IP domain can be handed off to the cellular domain when the phone leaves the WLAN, and a call initiated when the phone is in the cellular domain can be handed off to the IP domain when a phone joins a WLAN.

In general, prior to affecting a handoff of a call, the phone performs a registration re-selection in the new domain as described above for the case when there is no call that is active. The handoff of the active call is then performed into the new domain.

Specific handoff procedures are outlined below in the case of CMDA and GSM networks, for which the procedures differ somewhat.

5.1 CMDA Handoff to the IP Domain

Figure 11A:
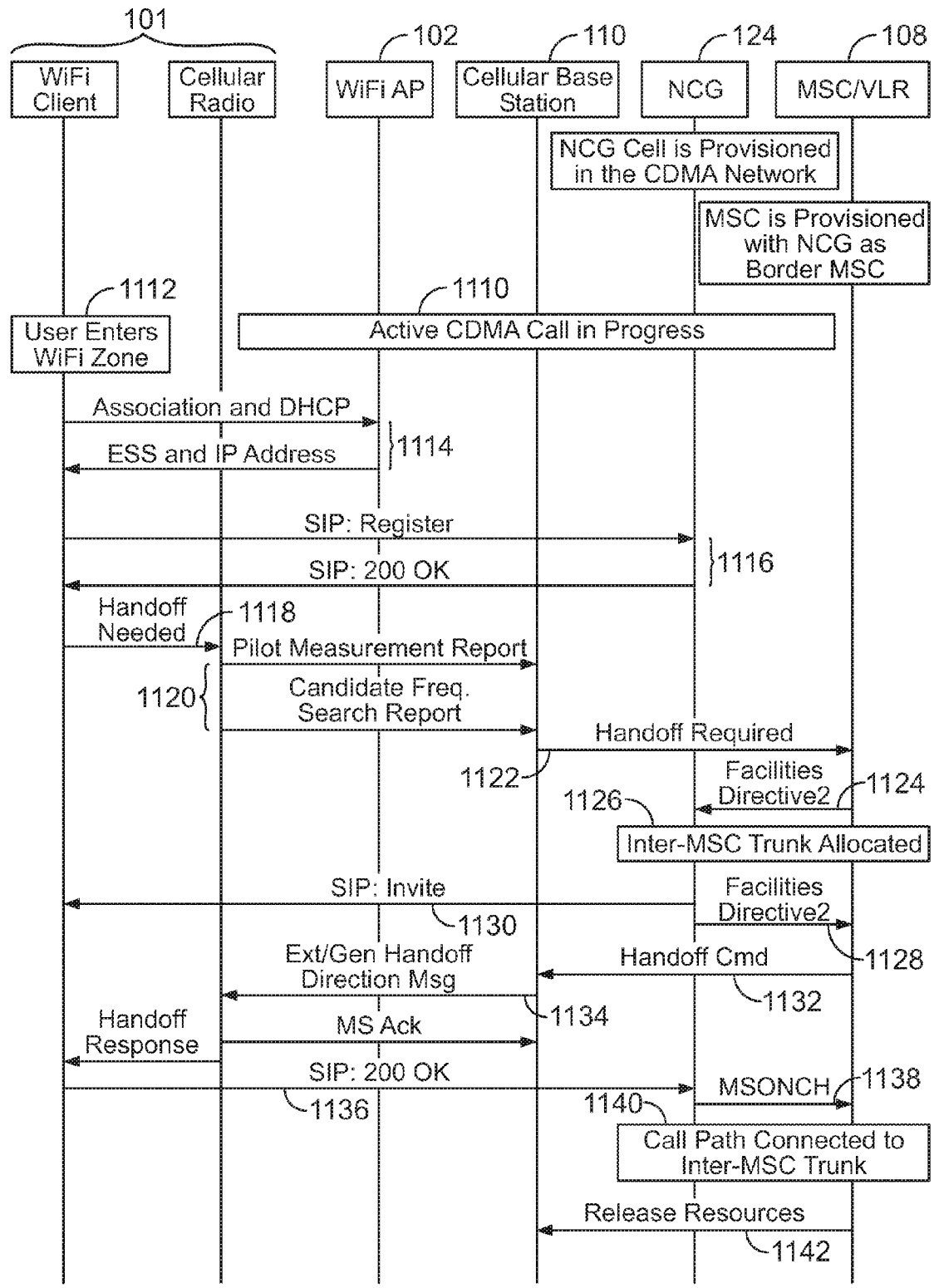
FIG. 11A is a timing diagram of a handoff from the CDMA domain to the IP domain.

Referring to FIG. 11A, in the case of a CMDA cellular telephone network a user is initially conducting a call over the cellular radio network (1110). A handoff of an active cellular telephone call on the cellular radio network may be initiated by the user entering the proximity of a suitable WiFi network (1112). The user's dual mode telephone includes a WiFi client as well as a cellular radio. When the user enters a preferred WiFi Zone, the WiFi client scans for and detects the WiFi Zone. An association is created with the WiFi access point (AP) 102, and via the AP, the WiFi client obtains the Extended Service Set and IP Address, for example, from a router on the LAN (1114).

The WiFi client sends a SIP Registration message to the NCG 124 that contains an indication of a local registration only. The NCG does not provide any update to the HLR at this time. NCG network locally registers the subscriber and sends back an Acknowledgement (1116). In the acknowledgement, NCG cell information is included. The cell information includes information that identifies a virtual cell that is controlled by the NCG, for example, being provided to the NCG at the time it is provisioned in the CMDA network.

When the WiFi client receives the acknowledgement, it informs the cellular radio that a handoff will be needed and provides information from the acknowledgement to the radio (1118). The CDMA radio includes the NCG cell as the strongest and the most suitable cell in the measurement reports to the CDMA network.

Upon receiving this acknowledgement, CDMA Radio, in the subsequent Pilot Measurement Reports to the Base Station indicates the serving frequency pilots are not strong enough. In the measurement report of the Candidate Frequencies, CDMA Radio reports that the NCG cell is the most and only suitable Candidate Frequency (1120).

Upon analysis of the measurement reports and candidate frequency search reports, the Cellular base station determines that the strongest and most suitable cell (NCG Frequency) is not served by the serving Base Station Controller. The Base Station Controller sends a Handoff Request (1122) to the serving MSC with information about the NCG "Frequency" and related Cell Information.

Upon receiving Handoff Required Message, the serving MSC identifies the Target NGC based on the border-MSC provisioning information. The serving MSC sends a Facilities Directive2 message to the NCG (1124) to trigger a MSC to MSC handoff. At the same time an inter-MSC trunk is allocated between the serving MSC and Target NCG (1126). The trunk is allocated by the Serving MSC.

The NCG responds with a 'facilities directive 2' acknowledgement to the Serving MSC (1128). In this acknowledgement, a dummy handoff traffic channel assignment is included in form of Handoff Direction Message. At the same time, the NCG sends a SIP INVITE to the WiFi Client (1130). This message contains an indication to the WiFi Client to accept the INVITE without alerting the subscriber.

Upon receiving the 'facilities directive 2', Serving MSC sends a Handoff Request Message to the Base Station (1132). This message contains the Handoff Direction Message received in the 'facilities directive 2' message.

Upon receiving the Handoff Request, the Base Station sends the Handoff Direction Message (contained in the Handoff Request) to the CDMA radio (1134). At this point, WiFi Client sends the SIP 200 OK (1136) to the NCG in response to the SIP INVITE (1130) sent earlier. The NCG in turn indicates (via MSONCH message) to the Serving MSC that the Mobile Station has successfully switched to the NCG Frequency and the hard handoff is complete (1138). At this time, Serving MSC connects the call voice path to the inter-MSC trunk previously allocated (1140). Also, Serving MSC requests the Base Station to release all traffic channel resources related to the given voice call (1142).

At this point the voice path is switched and call is continued through the NCG and the WiFi network.

5.2 Handoff to the CMDA Cellular Domain

Figure 11B:
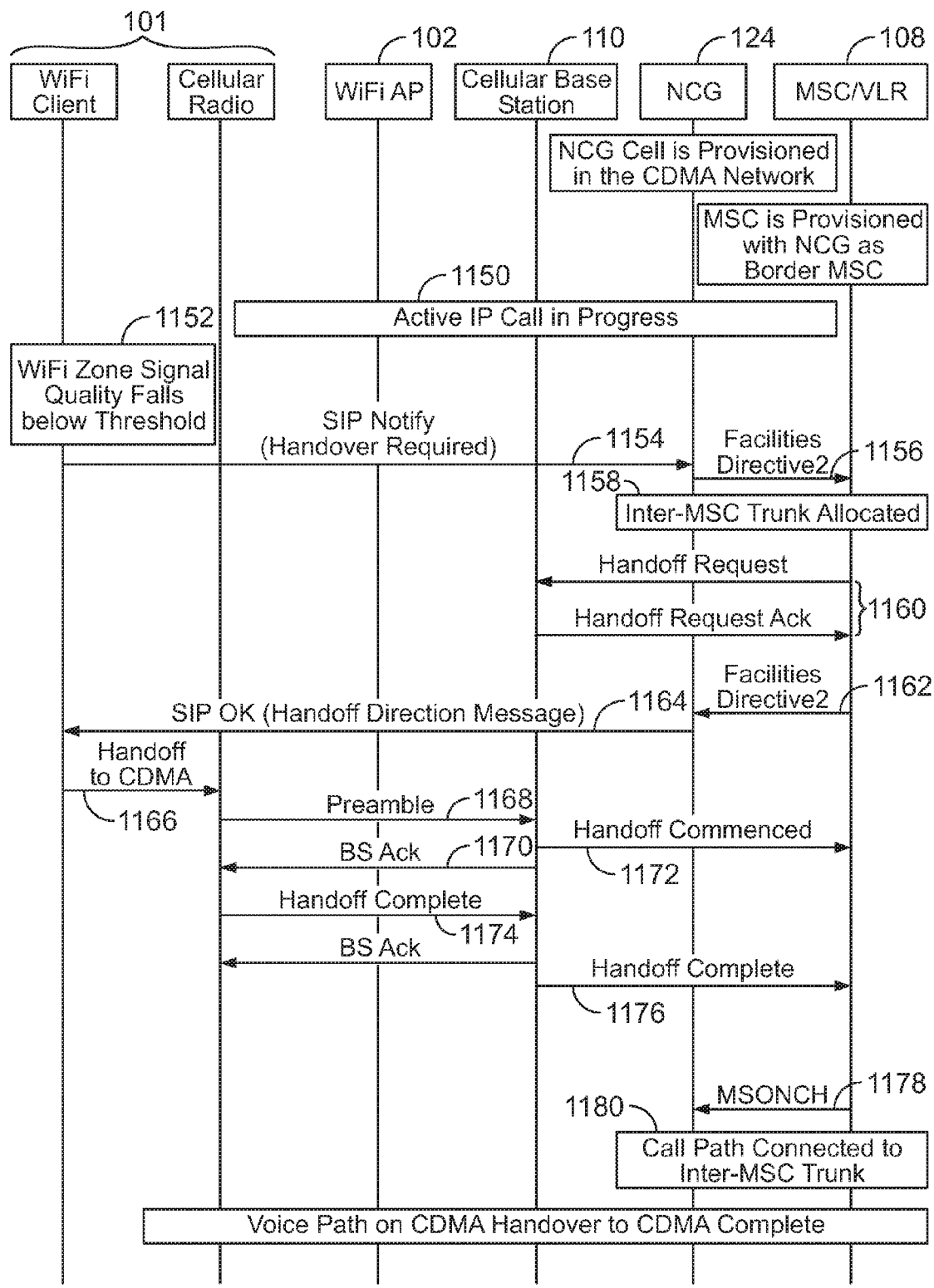
FIG. 11B is a timing diagram of a handoff from the IP domain to the CDMA domain.

Referring to FIG. 11B, in the case of a user is initially conducting a call over the IP network (1150). A handoff of the active IP call may be initiated by the user leaving the proximity of the WiFi network, for example, detected by the WiFi signal quality dropping below a specified threshold (1152).

When the WiFi Client detects its departure from the proximity of the WiFi network, it sends a SIP Notify message to the NCG that indicates a handoff trigger to the CDMA network (1154). In this message a channel measurement report (along with related information) is included.

Upon receiving the handoff trigger (in form of SIP Notify Message), the NCG sends a Facilities Directive message to a target MSC serving the most suitable cell (of the Notify Message) (1156). This triggers a MSC to MSC handoff. The target MSC is identified by the SID/NID of the most suitable cell. At the same time an inter-MSC trunk is allocated between the NCG and Target MSC, by the NCG (1158).

Target MSC upon receiving the Facilities Directive message sends a Handoff Request message to the target Base Station Controller of serving the most suitable cell (1160). The target Base Station Controller allocates new traffic channel resource and send a Handoff Request Ack to the target MSC.

The target MSC respond with a 'facilities directive2' message to the NCG (1162). In this acknowledgement, the new traffic channel assignment is included in form of Handoff Direction Message.

Upon receiving the 'facilities directive2', the NCG sends a SIP OK (1164) in response to the Notify message (1154). This SIP OK contains the entire Handoff Direction Message received in the 'facilities directive2' message from the target MSC.

Upon receiving the SIP OK message, the WiFi Client forwards the Handoff Direction Message to the CDMA Radio (1166). The CDMA Radio transitions to the traffic channel mode and starts to transmit Preamble and the Handoff Complete message on the new traffic channel (1168).

When the target base station receives the Preamble from the cellular radio, the base station responds with the BS Ack message (1170). Also, it sends a Handoff Commenced indication to target MSC (1172).

Upon receiving the BS Ack, the phone completes the handoff by sending Handoff Complete message to the Base Station Controller (1174). In response, Base Station Controller sends the Handoff Complete to the target MSC (1176). The target MSC in turn indicates the handoff complete to the NCG via a MSONCH message (1178). At this time the call voice path is connected to the inter-MSC trunk allocated earlier (1180).

5.3 GSM Handoff to the IP Domain

Figure 12A:
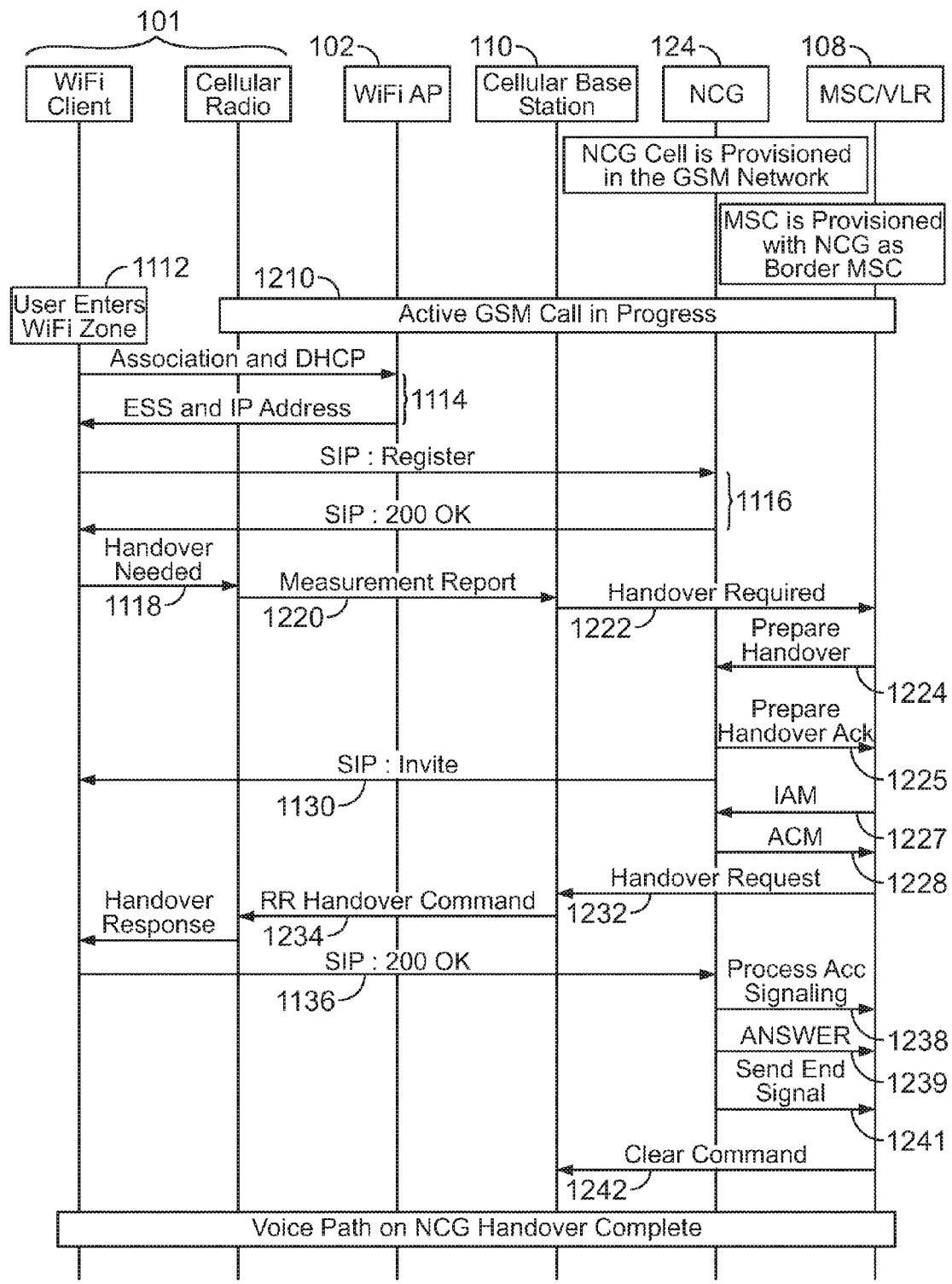
FIG. 12A is a timing diagram of a handoff from the GSM domain to the IP domain.

Referring to FIG. 12A, handoff from a GSM network to the IP domain is similar to that shown in FIG. 11A with reference to a CDMA network. In FIG. 12A, a user is initially conducting a call over the cellular radio network (1210). A handoff of an active cellular telephone call on the cellular radio network may be initiated by the user entering the proximity of a suitable WiFi network (1112)

As in the CDMA case, the WiFi client obtains an IP address and registers with the NCG (1114, 1116) and informs the GSM radio that a handover is needed (1118)

The GSM Radio sends measurement reports to the GSM network 1220), which include the NCG Cell as the strongest and the most suitable cell. The Base Station sends a Handover Required Message to the serving MSC (1222) with information about the Target NGC Cell and related parameters.

Upon receiving Handover Required Message, Serving MSC identifies the target NCG based on the provisioning information. The Serving MSC sends a Prepare Handover Request message to the NCG (1224) to trigger a MSC to MSC (NCG) handover.

The NCG, upon receiving the Prepare Handover Request, retrieves a Handover Number for routing the connection of the call. The NCG responds with a Prepare Handover Ack to the Serving MSC (1225). In this acknowledgement, the handover number along with a dummy handover traffic channel assignment is included in form of RR HANDOVER COMMAND Message. At the same time, the NCG sends a SIP INVITE to the WiFi Client (1130). This message contains an indication to the WiFi Client to accept the INVITE without alerting the subscriber.

Upon receiving the Prepare Handover Ack, the Serving MSC establishs a circuit between itself and GSC. This is done by the IAM (Initial Address Message) (1227) and ACM (Address Complete Message) (1228) exchange. After the circuit establishment, the Serving MSC sends a Handover Request Message to the Base Station (1232). This message contains the RR HANDOVER COMMAND Message received in the Prepare Handover Ack message.

Upon receiving the Handover Request, the base station sends the RR HANDOVER COMMAND message (contained in the Handover Request) to the phone (GSM radio) (1234). At this point, WiFi Client sends the SIP 200 OK to the NCG (1136) in response to the SIP INVITE (1130). This triggers a ProcessAccSignaling message to be sent to the Serving MSC (1238). Along with that the NCG also sends ANSWER message to Serving MSC (1239) to connect the voice circuit between the two entities. The NCG also signals the Serving MSC to releases its traffic channel resources by sending SendEndSignal message (1241). The Serving MSC releases the traffic channel resources.

The voice path is then switched and call is continued on the IP network via the NCG.

5.4 Handoff to the GSM Cellular Domain

Figure 12B:
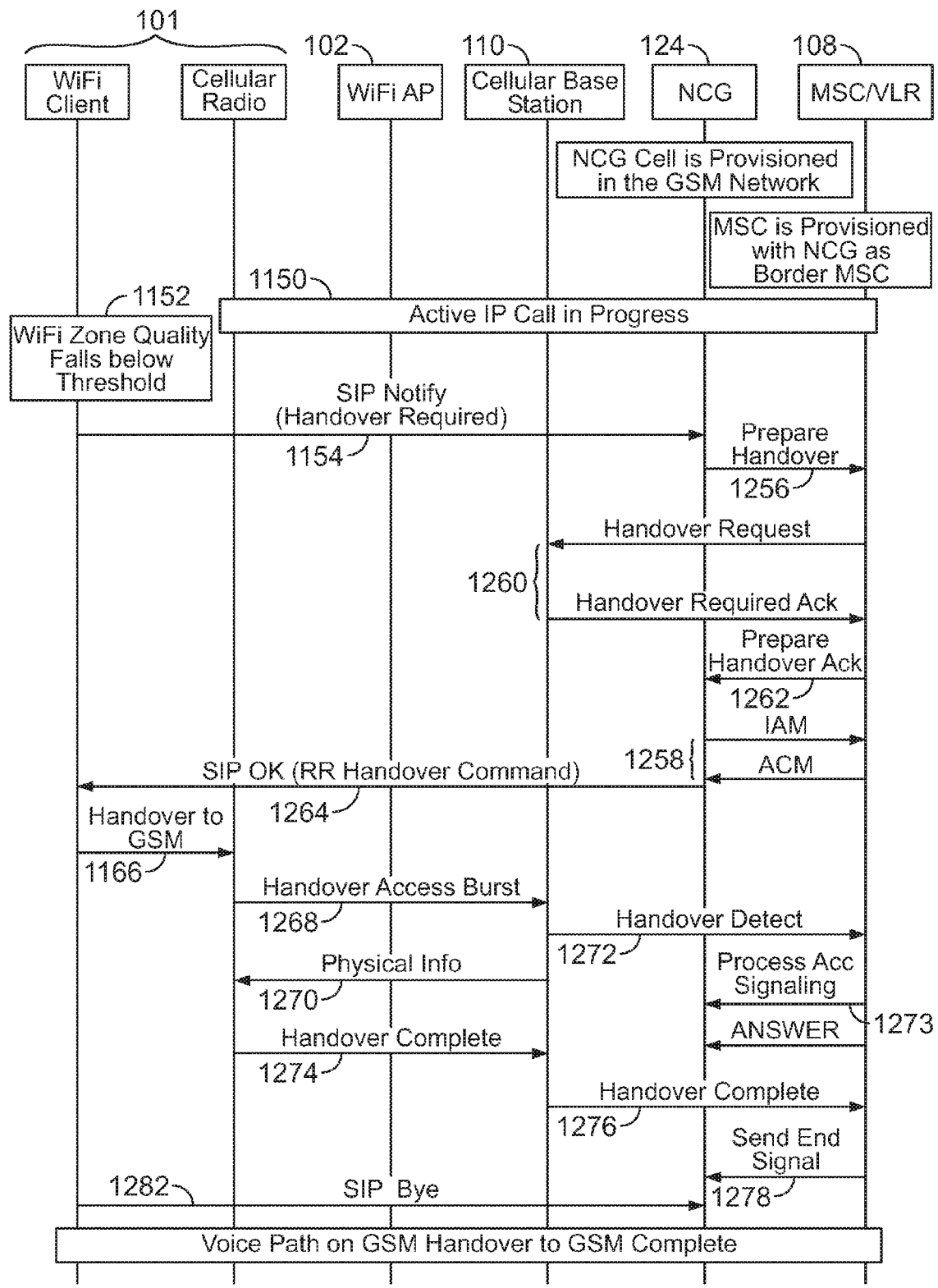
FIG. 12B is a timing diagram of a handoff from the IP domain to the GSM domain.

Referring to FIG. 12B, in the case of a user is initially conducting a call over the IP network (1150). A handoff of the active IP call may be initiated by the user leaving the proximity of the WiFi network, for example, detected by the WiFi signal quality dropping below a specified threshold (1152).

When the WiFi Client detects its departure from the proximity of the WiFi network, it sends a SIP Notify message to the NCG that indicates a handoff trigger to the CDMA network (1154). In this message GSM channel measurement report is provided by the WiFi Client. PLMN and LAC of each channel shall be also included in the message.

Upon receiving the handover trigger (in form of SIP Notify Message), the GSC sends a Prepare Handover Request (1256) to the target MSC serving the most suitable cell (of the Notify Message). This triggers a MSC to MSC handover. The target MSC is identified by the PLMN and LAC of the most suitable cell.

The target GSM MSC, upon receiving the Prepare Handover Request, retrieves a Handover Number for routing the connection of the call. Along with that it shall send a Handover Request Message (1260) to the target base station serving the most suitable cell. The target base station allocates a new traffic channel resource and send a Handover Request Ack to the target MSC (1260). The target MSC responds with a Prepare Handover Ack to the Serving NGC (1262). In this acknowledgement, the handover number along with the new handover traffic channel assignment is included in form of RR HANDOVER COMMAND Message.

Upon receiving the Prepare Handover Ack, Serving NCG establishs a circuit between itself and the target MSC. This is done by the IAM (Initial Address Message) and ACM (Address Complete Message) exchange (1258). After the circuit establishment, the NCG sends a SIP OK (1264) in response to the Notify message (1154). This SIP OK contains the entire RR HANDOVER COMMAND Message received in the Prepare Handover Ack from the target MSC.

Upon receiving the SIP OK message, WiFi Client indicates to the GSM Radio the RR HANDOVER COMMAND message (1166). GSM Radio transitions to the dedicated mode and starts to transmit Handover Access bursts on the new traffic channel (as indicated in the handover command message) (1268).

When the target base station receives the handover bursts from the GSM Radio, the base station responds with the Physical Info message (providing the frequency correction and timing advance info) (1270). Also, it sends a Handover-Detect indication to Serving MSC (1272). This triggers the Serving MSC to send ProcessAccSignaling message to the NCG (1273). Along with that the MSC also sends ANWSER message to NCG to connect the voice circuit between the two entities.

A GSM Layer2 link is established between the GSM Radio and the base station. A Handover Complete message is sent by the GSM Radio (1276) and the audio path is switched to GSM mode to continue the call in GSM network. The Serving MSC also signals the NCG to releases its traffic channel resources by sending SendEndSignal message (1278). GSC releases the traffic channel resources.

If possible (as permitted by WiFi signal conditions), WiFi Client sends SIP BYE message to the NCG network to release resources (1282). In any case, the NCG releases the resources previously used by the IP call.

5.5 Candidate Traffic Channels

A distinction is made between "re-registration" while the WiFone is in the Idle State and "handoff" while the WiFone is processing a call. Re-registration is the process of reselecting the macro network when the serving WiFi network no longer has sufficient signal strength or the system has otherwise determined that a transition to the cellular network is warranted, for example, because of a user command or an automatic detection of an imminent exit from a WLAN. Handoff is the reselection of a macro frequency that is controlled by a non-NCG to which a current session may be transferred when the WiFi network detects diminishing signal strength or the system otherwise determines that a transition to the cellular network is warranted.

While registered on a WLAN, the phone may continue to measure the signal strength of neighboring cellular radios. During the Registration process the WiFone provides a List of Candidate Traffic Channels that it used prior to powering down the cellular radio. When the WiFone is about to make a re-selection or handoff to the cellular domain the WiFone sends a request to the NCG to handoff the session and include the current access point signal strength measurement for the channels in the Candidate List it last received from the cellular network.

If the NCG decides that a handoff is needed, it may signal the WiFone to initiate a Candidate Frequency Search. The WiFone then measures the power levels of the surrounding traffic channels sent from the NCG and returns the signal strength measurements of the candidate list to the NCG. The NCG determines which traffic channels are good handoff targets.

Figure 13:
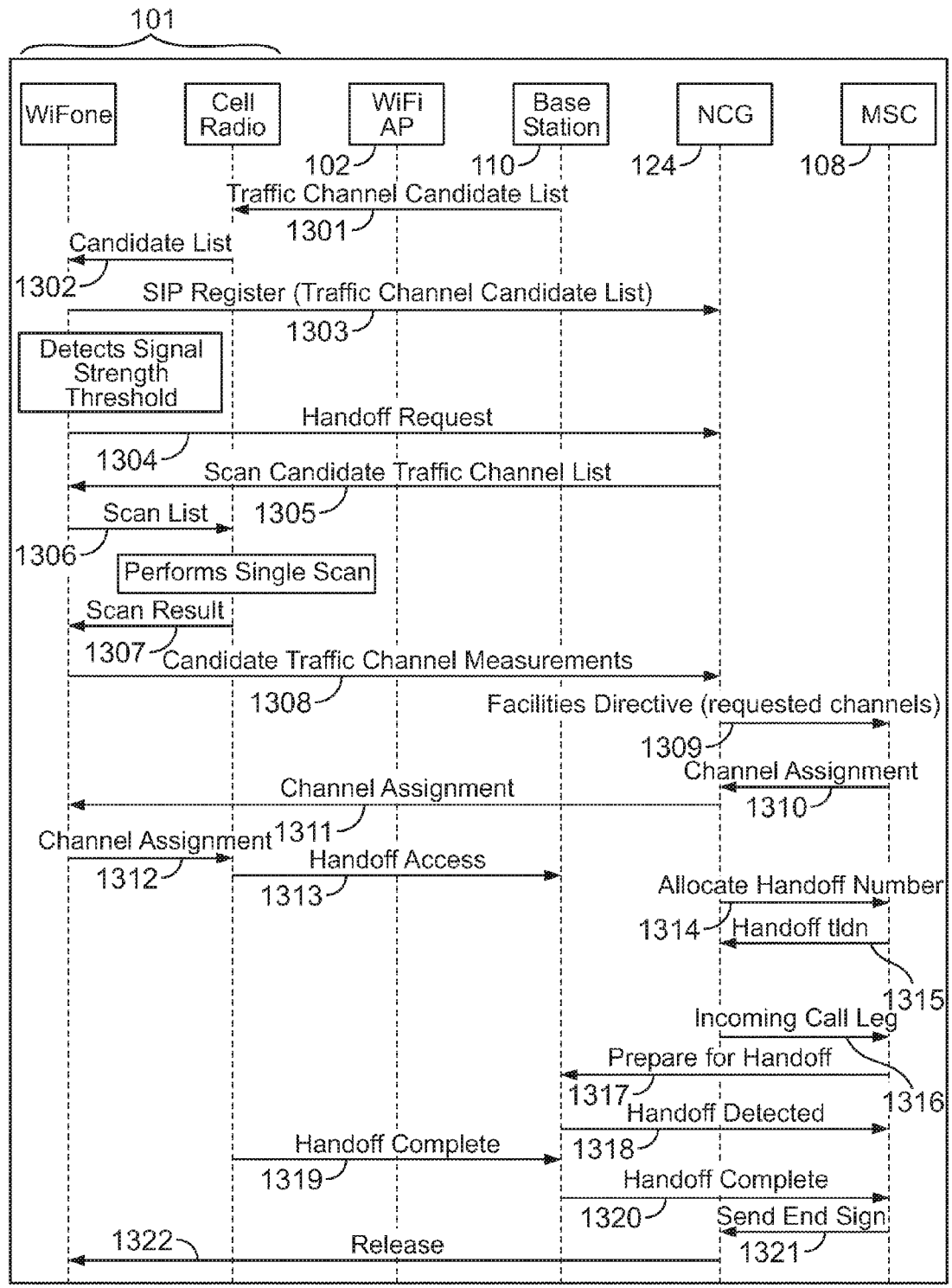
FIG. 13 is a timing diagram of a handoff from the IP domain.

Referring to FIG. 13, the WiFone executes the following procedures to handoff a session to the cellular network. The WiFone previously has obtained from the cellular radio a Traffic Channel Candidate List 1301-1302 prior to registering with the NCG. The phone sends this list to the NCG when it registers 1303 and the NCG store the Candidate List while the WiFone is served by the NCG.

The phone determines that it needs to or is instructed by the system to perform a handoff from the IP domain, and it sends a handoff request 1304 to the NCG. The NCG requests that the WiFone scan a list of traffic channels 1305 and return the signal strength measurements. The NCG includes the Candidate List that it stored at registration.

The WiFone scans the Candidate List. This is a single scan and will generally include no more than 12 candidate channels. The WiFone prioritizes the traffic channels and send the result of the measurements 1308 to the NCG using a SIP Info method.

After screening the list of traffic channels provided by the WiFone, the NCG sends a Facilities Directive message 1309 to the target MSC. The target MSC acknowledges the Handoff request 1310, indicates it can support the requested handoff, and provides a handoff command that indicates the radio channel to which the WiFone should be directed. The NCG sends the WiFone the channel assignment 1311.

The WiFone tunes to the assigned channel and identifies itself using the handoff reference ID 1313. The base station optionally processes an Origination Message as an implicit registration of the WiFone sending the message. The base station can obtain complete registration information about the WiFone at any time by sending a Registration Request Order to the WiFone.

The NCG request routing information from the target MSC 1314. The MSC assigns a handoff tldn and sends the routing information to the NCG 1315. The NCG sets up the third call leg to the MSC 1316.

The MSC instructs the base station to prepare for handoff 1317 and assigns a TDM traffic channel to the base station. The Prepare for handoff contains the Handoff Reference ID. The target base station indicates it has detected the WiFone 1318. The WiFone re-register with the cellular network only after the current session is complete.

The MSC routes the TDM traffic to the base station and the third leg of the call begins. To keep the audio interruption short, the WiFone does not switch its audio path from WiFi mode to cellular mode until handoff is complete. The WiFone then indicates to the base station that the handoff is complete 1319. The base station informs the MSC that the process is complete 1320. The MSC informs the NCG that the process is complete by launching a Send End Sign message 1321. Finally, the NCG mutes the RTP path to the WiFone and instructs the WiFone that the handoff is complete 1322, which closes the current IP session.

6 Registration Using a Proxy

Figure 17:
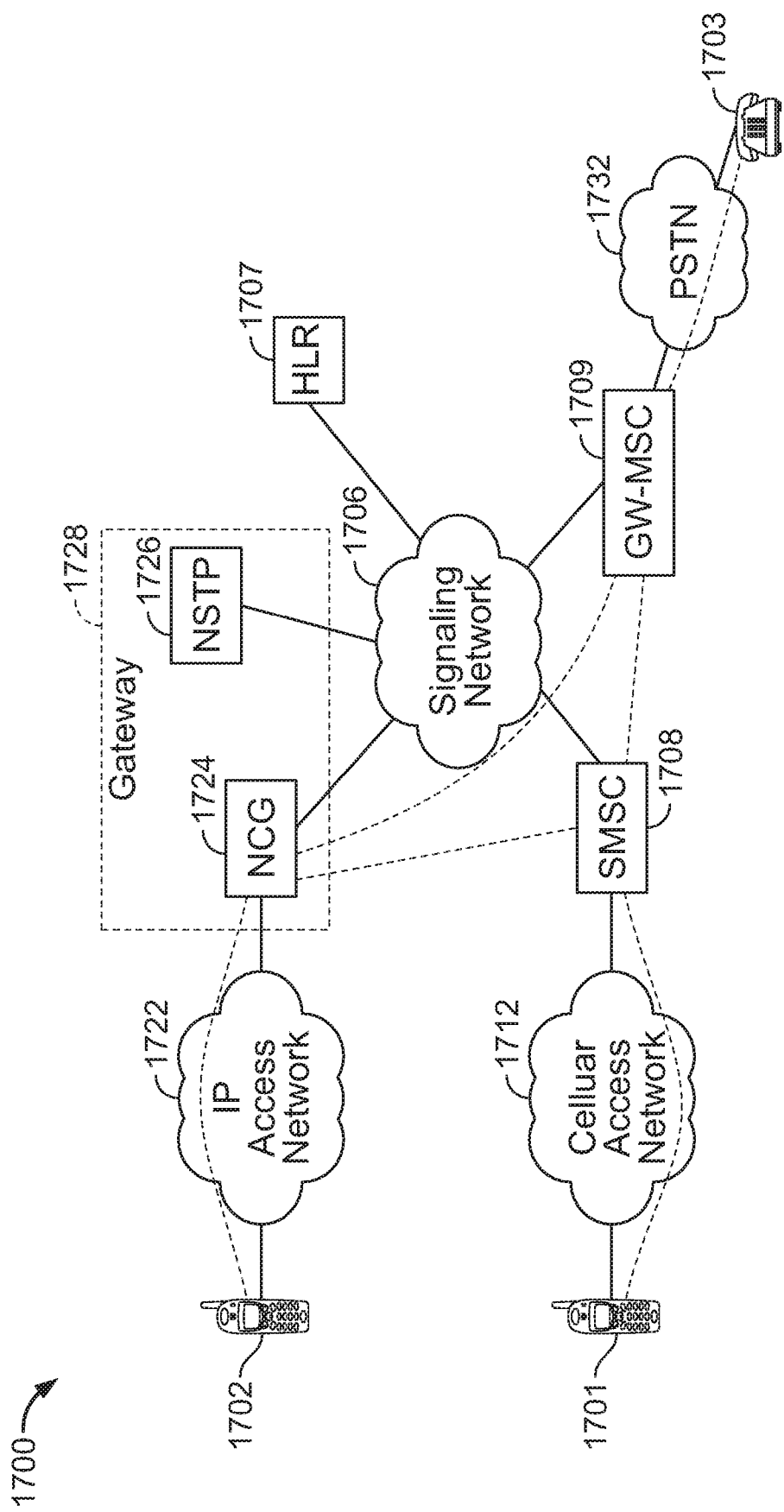
FIG. 17 is a block diagram of a telecommunication system.

Referring to FIG. 17, in another embodiment, a telecommunication system 100 enables a subscriber to communicate using multiple terminals, each registered on a different access network. In FIG. 17, a first terminal is a cellular telephone 1701 that is register on a cellular access network 1712. A second terminal is a voice-over-IP telephone that is registered over an IP-based access network 1722, which in general includes both a wide area network as well as a local area (e.g., WiFi) network. A number of conventional cellular telephone devices allow calls to be delivered, for example, from a telephone 1703 on the public switched telephone network (PSTN) 1732 to the cellular telephone 1701. For example, a serving MSC 1708 provides an access point to the cellular telephone network for the cellular telephone 1701 and a gateway MSC 1709 provides an access point from the PSTN for incoming calls.

In situations in which the subscriber is only registered on the cellular access network 1712, when a call is placed to the subscriber's mobile telephone number from the PSTN, based on information stored at the Home Location Register (HLR) 1707 associated with the subscriber's number, the gateway MSC 1709 routes the telephone call to the serving MSC 1708, through which the call delivered to the cellular telephone 101. The HLR 1707 has information that identifies the specific serving MSC 1708 for the telephone based on a registration procedure. During registration, the cellular telephone provides its mobile identification to the serving MSC, which determines the subscriber's HLR based on the mobile identification, and forwards the registration information to the HLR 1707.

The system also includes a "nomadic control gateway" (NCG) 1724, which provides a way for calls to be delivered from the gateway MSC 1709 to a voice-over-IP (VoIP) telephone 1702. Specifically, the NCG includes a media gateway that converts the telephone circuit to a packet format for VoIP, and also emulates the function of an MSC from the point of view of the signaling network.

In addition to the native HLR for the cellular network, the system includes a NSTPF 1726, which provides a proxy HLR function. The NSTPF serves a role in receiving registration information from the subscriber terminals in both the IP and cellular access networks, and passing registration information to the native HLR 1707. The NSTPF maintains presence and location information for a subscriber on multiple access networks at the same time. The NSTPF 1726 and the NCG 1724 work together, can be hosted in a single device or distributed to different locations in the system. In FIGS. 18A-D, they are represented as a single device, gateway 1728.

Figure 18A:
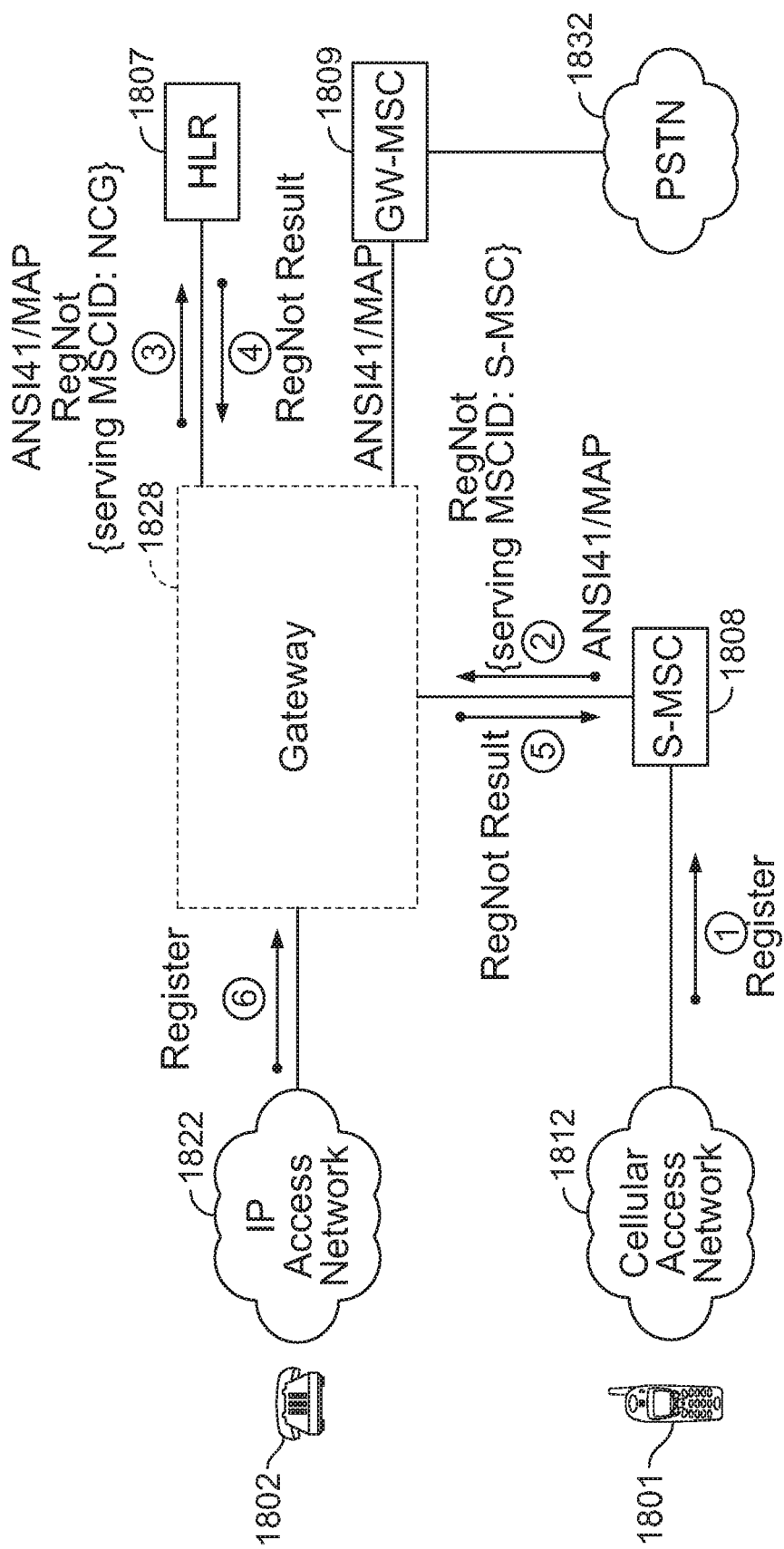
FIGS. 18A-D are diagrams that illustrate interactions between components of the telecommunication system.

Referring to FIG. 18A, subscriber terminals 1701 and 1702 both register with the system. In the case that the subscriber can receive telephone calls both over the cellular network and over the IP network, the system is configured to preferably deliver the call over the IP network. In alternative configurations, the call could ring concurrently on multiple access networks, ring in sequence, or follow some other call delivery rule.

In FIG. 18A, the cellular telephone 1701 first registers on the cellular access network 1712 through the serving MSC 1708. The serving MSC 1708 provides the mobile identification number to the signaling system which identifies the NSTPF 1726 (as opposed to the native HLR 1707) as the home location register of the telephone. Note that this is configured information is configured by the subscriber's service provider on a subscriber-by-subscriber basis. That is, some subscribers have traditional cellular service, and the serving MSC would be informed that the home location register for the subscriber is the native HLR 1707 rather than the NSTPF 1726.

When the NSTPF 1726 receives the registration request from the serving MSC 1708, it records the identification of the serving MSC, and forwards the registration request to the native HLR 1707. However, in the forwarded registration request, the NSTPF has replaced its own MSC id as the serving MSC, rather than the actual serving MSC 1708. The native HLR responds to the NSTPF's registration request, which forwards a response to the actual serving MSC. The serving MSC then has the required subscriber information, such as service authorization, that was sent by the native HLR 1707. In this way, the NSTPF 7126 functions as a HLR proxy to the native HLR from the point of view of the serving MSC.

When the VoIP phone 1702 registers with the NCG 1724, the NCG 1724 informs the NSTPF 1726 of the registration. At this point, the NSTPF is aware of the concurrent presence of both terminals, but the native HLR is not.

Figure 18B:
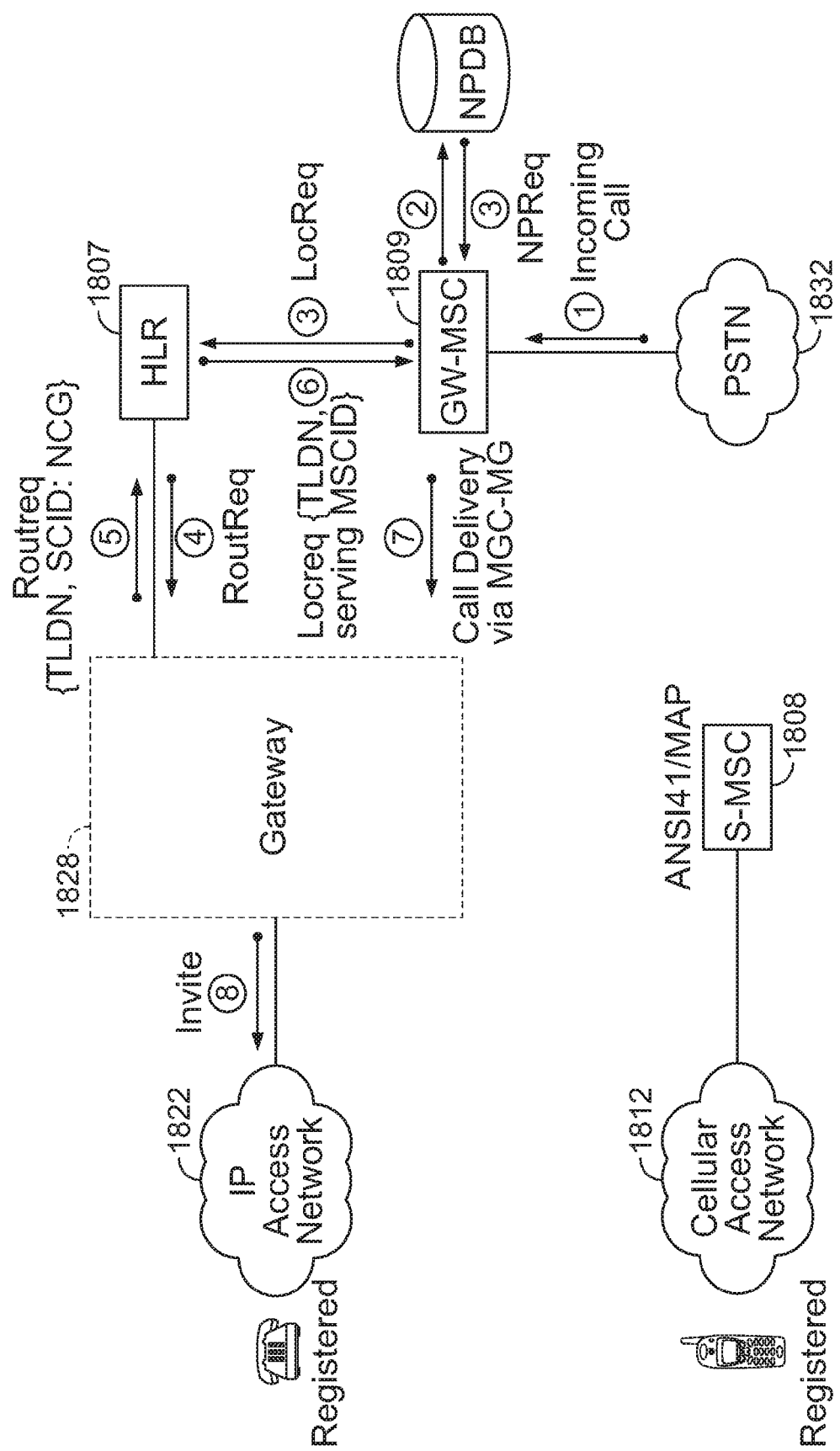

Referring to FIG. 18B, an incoming call is first received over a circuit-switched network by the gateway MSC 1709. The gateway MSC optionally performs a number portability lookup by querying a number portability database. At this point the gateway MSC has a mobile telephone number of the subscriber's cellular telephone 1701. The gateway MSC determines the HLR based on the mobile telephone number, and sends a location request to the HLR 1707. The NSTPF is registered as the serving MSC, and therefore the HLR sends the location request to the NSTPF. The NSTPF responds identifying the media gateway of the NCG 1724 as the destination where to route the call. This information is passed back by the native HLR to the gateway MSC, which establishes a circuit to the media gateway. The media gateway then establishes the VoIP connection to the subscriber's VoIP telephone. In an alternative embodiment, the gateway MSC can be informed that the NSTPF is the HLR for the subscriber, thereby bypassing the native HLR in determining where to route the call.

Figure 18C:
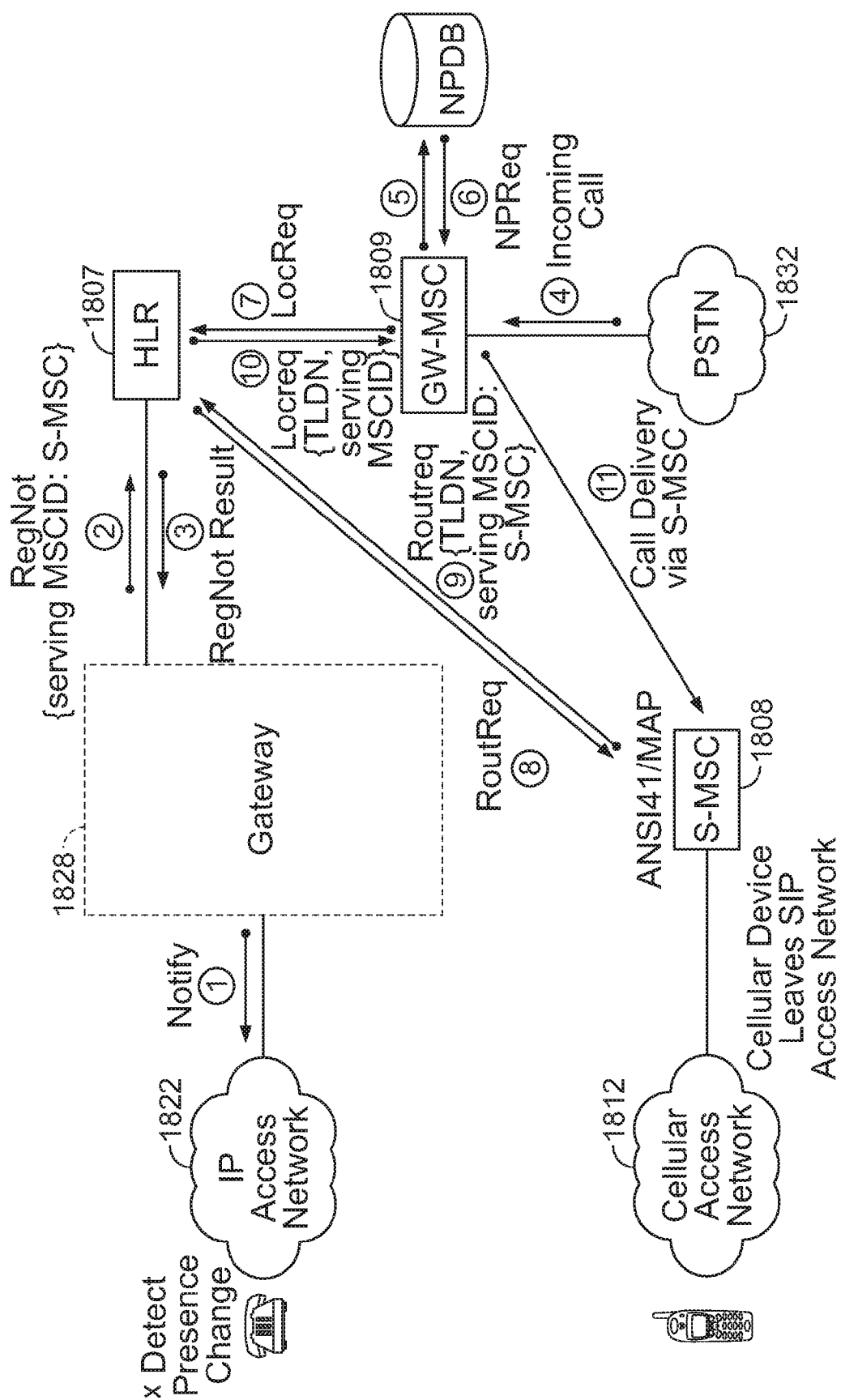

Referring to FIG. 18C, if the subscriber's VoIP telephone deregisters from the network, for example because the VoIP telephone 1702 leaves the network, the NSTPF is informed that calls are no longer to be routed to the VoIP phone. After deregistering, when a gateway MSC needs to determine where to route a call, it will be informed that the call should be routed to the serving MSC of the cellular network rather than to the media gateway of the VoIP access network. This is accomplished by having the NSTPF sending a deregistration messages to the native HLR, which also informs the native HLR that the subscriber is now being served by the cellular serving MSC. After that re-registration, the gateway MSC is directly informed of the identification of the serving MSC by the native HLR, without necessarily involving the NSTPF. The gateway MSC then routes the call to the serving MSC. Alternatively, the NSTPF does not re-register with the HLR, but rather routes to location request from the HLR to the cellular serving MSC as a proxy from the point of view of the native HLR.

In an alternative embodiment, all call may be routed to the cellular network through the NCG which acts as the serving MSC for both cellular and IP phones. For example, if the cellular phone and the VoIP phone are to ring concurrently, the gateway MSC can route the call to the NCG, which then rings both the VoIP phone as well as the cellular phone through the actual cellular serving MSC.

Figure 18D:
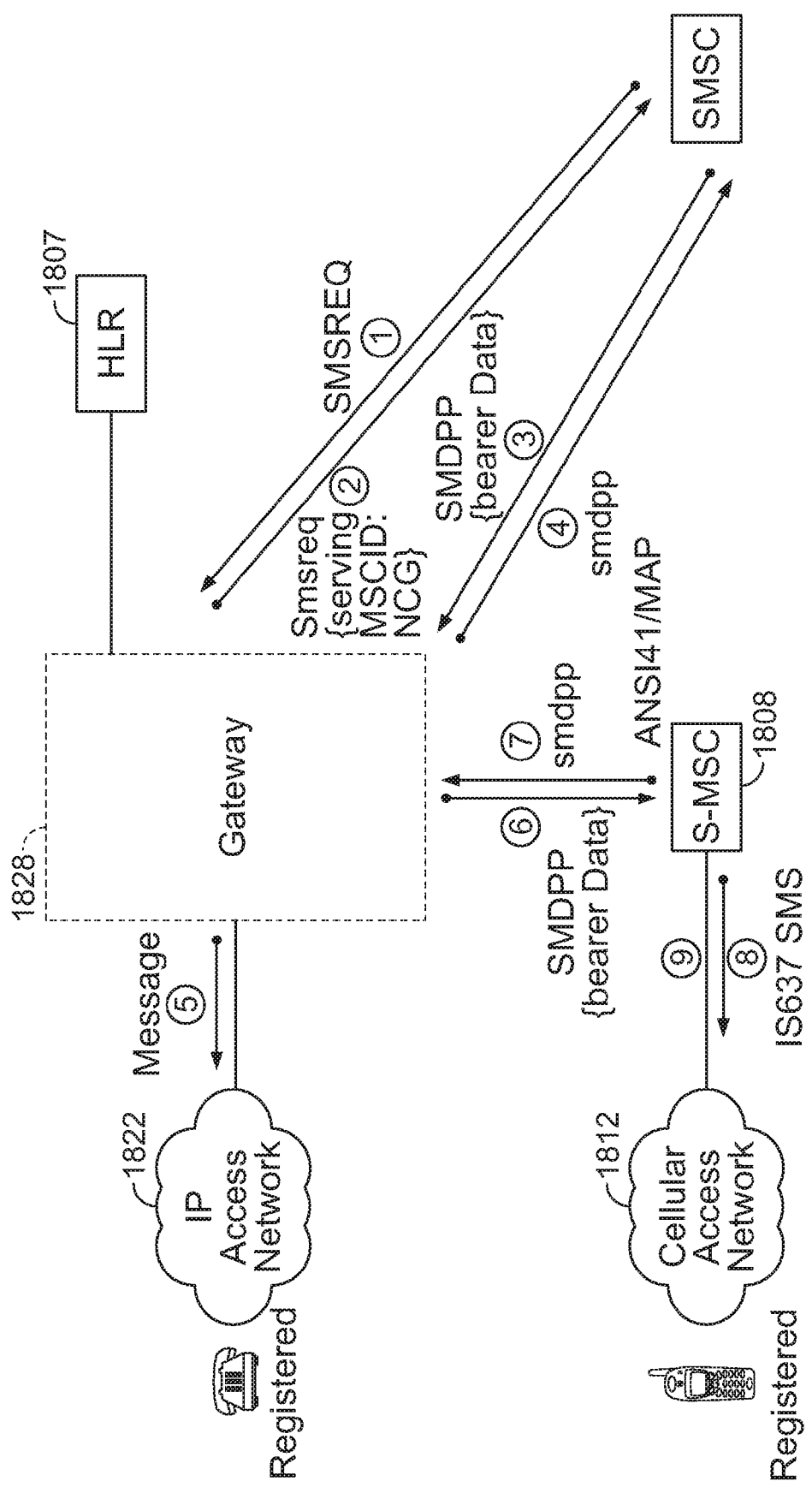

Referring to FIG. 18D, SMS messages are routed through the NCG, for example, for concurrent delivery to both through the IP access network and the cellular access network. The SMS message is sent to a particular mobile number, the NSTPF identifies the NCG as the serving MSC for the mobile number. The NCG then passes the message to one or both of the access networks.

In the description above, the access networks include an IP network and a cellular network. In other embodiments, other types of access networks may be used. For example, there may be multiple different IP networks, such as a WiMax and a WiFi network, multiple WiFi networks, a BlueTooth network, or multiple cellular networks (e.g., a CDMA and a GSM network). An access network could include a wired network, or even another connection to the PSTN, for example, to support concurrent delivery of calls to a cellular network and the PSTN.

7 Client Software Architecture

Figure 14:
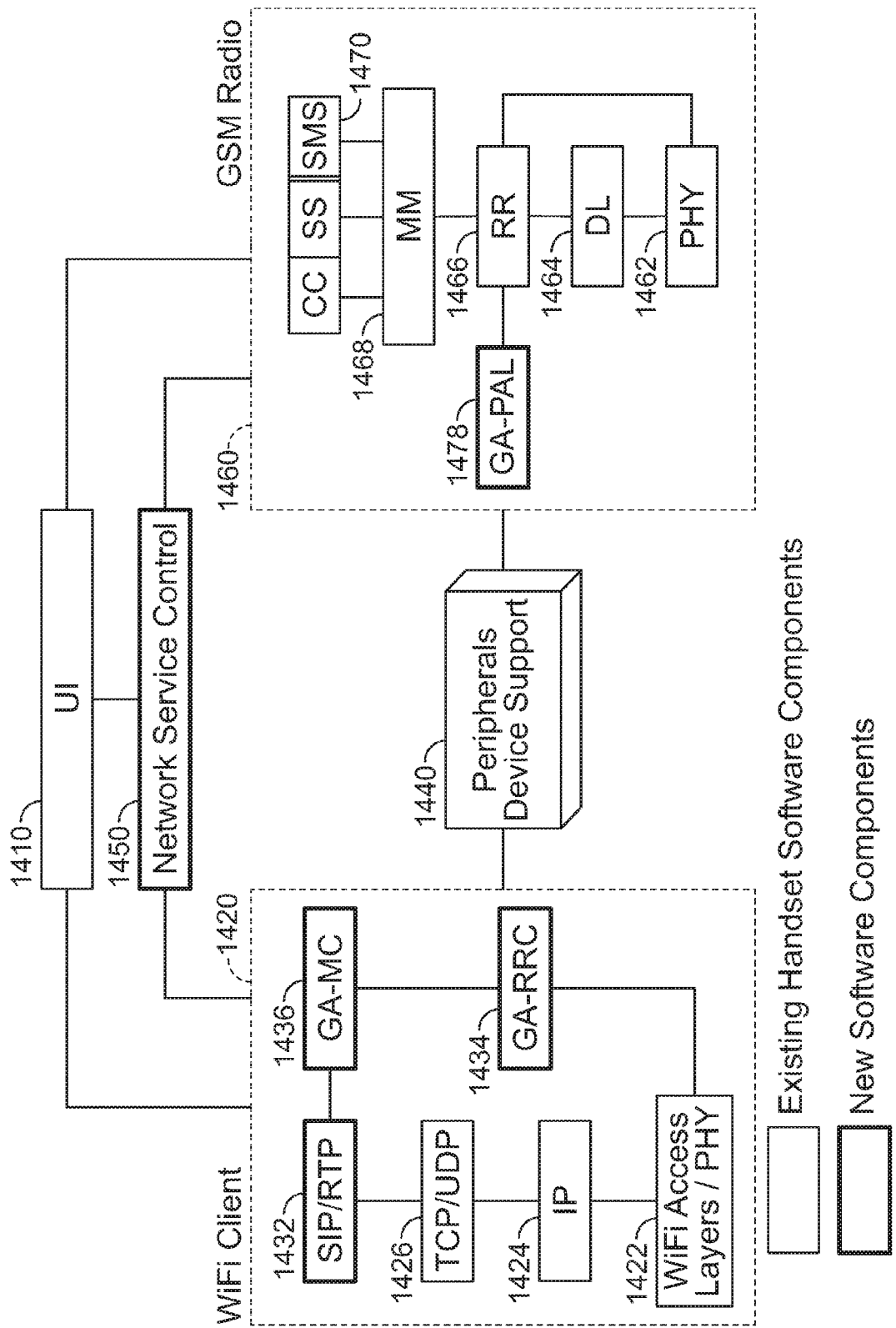
FIG. 14 is a software block diagram of a dual mode (GSM and WiFi) client.

Referring to FIG. 14, a dual mode client (also referred to as a WiFone above), in this case a version of the client for use in a combination of a GSM cellular network and a WiFi wireless local area network, includes conventional software components and additional components that augment the functionality of the client to support operating features described above. Note that in large part, the foregoing description generally use terminology commonly associated with CDMA networks. This section generally uses terminology associated with GSM networks. Note that in the foregoing description as well as in this section, the approaches described are applicable to a variety of types of wireless telephone networks, including CDMA and GSM cellular networks.

The software architecture for the client shown in FIG. 14 includes a number of conventional components that would be found in an implementation of a dual mode telephone, which does not necessarily support features described above. A User Interface (UI) 1410 is an existing component in the GSM Handset Software, with any necessary enhancements to use WiFi as an alternate medium to GSM such that from the UI perspective the user experience is the same for both the modes of operation.

A GSM Radio component 1460 consists of the standard GSM Protocol Stack to support GSM operations, including components 1462-1470. A new layer GA-PAL (Generic Access Protocol Adaptation Layer) 1478 is added to support dual mode operations.

A WiFi Client 1420 includes a conventional protocol stack, including modules 1422-1426, and additional software components 1432-1436 that support the WiFi operations such as SIP registration, originating SIP/VoIP calls, accepting SIP/VoIP calls, WiFi mobility management, WiFi radio monitoring etc.

A new layer, Network Service Control 1450, is added to control both the GSM Radio and the WiFi Client components, and provides a control path between the WiFi client 1420 and the GSM radio 1460. Roaming and handover activities are coordinated between GSM Radio and WiFi Client using the NSC 1450.

A Peripherals Device block 1440 represents all the peripheral device level support that exists in a GSM Handset Software. Peripheral devices include Display, Keypad, Audio, SIM, Data Storage, Battery etc.

Architecturally, the implementations of the WiFi client 1420 and of the GSM radio 146 are largely decoupled. Other than for handoffs, relatively little interaction is required between the two implementations.

In an example of a GSM to WiFi handoff, the GSM radio 1460 is active, with the exception of the GA-PAL 1478 module, as is the UI 1410. The NSC 1450 is aware that the phone is active in a GSM call. The NSC 1450 obtains information about the active cell, such as signal strengths to various base stations etc, from the GSM radio 1460. Based on a table accessible to the NSC, the NSC determines whether there is any suitable access point within the GSM in which the phone is currently located. If there is such an access point, the NSC 1450 activates the WiFi client 1420 and instructs the GA-MC 1436 to attempt to connect to the access point. The GA-MC uses the GA-RRC 1434 and the SIP/RTP 1432 to associate with the access point (if possible) and then perform the SIP registration with the NCG over the data network. Once the registration is done and the GA-MC reports back to the NSC, and then the handover process can be begun under the control of the NSC. The NSC receives from the GA-MC information that characterizes the "cell" associated with the NCG to which the SIP registration has been made and passes that information to the GSM radio 1460.

In a conventional GSM phone, the GSM radio 1460 interacts with a single serving MSC through the cellular network. The GSM radio monitors signal information on different channels, some of which may be controlled by different MSCs. The GSM radio 1460 passes this signal information to the serving MSC (or a base station controller of the MSC) which controls the handoff. If the signal information indicates that a channel of another MSC (the "handoff" MSC) is preferable, the serving MSC initiates and inter-MSC handoff.

The GSM to WiFi handoff case appears the same as an inter-MSC handoff from the point of view of the serving MSC. This is accomplished by the NSC passing information to the GSM radio 1460 that causes the radio to report preferable signal strength from the "cell" associated with the NCG, which causes the serving MSC to initiate an inter-MSC handoff.

The serving MSC communicates with the NCG, which passes cellular-phone commands to the phone encapsulated in SIP messages. The GSM radio is expecting a standard GSM radio handoff and waits for new traffic channel assignment. Here, the NCG sends a dummy traffic channel assignment to the serving MSC, which sends the dummy channel assignment to the phone. As soon as the GSM RR 1466 receives the dummy channel assignment, the NSC is informed of the arrival of the dummy channel assignment, which causes the voice path to switch over to the VoIP RTP signal path through the NCG.

For a handoff from WiFi to GSM, SIP/RTP 1432 is active passing voice traffic between the UI 1410 and the NCG and the GSM radio 1460 is functioning in a "suspended mode" in which limited GSM functionality is being performed including determining signal information that will be used to determine to which GSM cell the call will be handed off. This signal information is available to the NSC throughout the duration of the WiFi call. (An alternative is to completely shut off the GSM radio and remember signal information from when the GSM radio was last active.) The GA-PAL 1478 receives information from the lower layers of the GSM radio that it stores, including for the purpose of later resetting the state of the upper layers of the GSM radio once the whole GSM radio is reactivated.

If the call is to be handed off, for example, because the WiFi signal quality has deteriorated, the GSM radio is activated by the NSC, and the state of the upper layers of the GSM radio, which had been dormant, is reset by introducing messages into the lower layers of the GSM radio using the GA-PAL 1478. The GSM signal information is sent from the GSM radio, through the NSC, encapsulated in SIP packets in the WiFi client and sent to the NCG in the network. The NCG unwraps the signal information, which it uses to identify the handoff MSC using provisioned tables and to communicate with the handoff GSM MSC to cause the handoff. The handoff MSC requests traffic channel information from its base station controller, which the handoff MSC then sends back to the NCG. The NCG encapsulates this traffic channel information in SIP messages, and sends these SIP messages to the phone. The NSC then receives the new traffic channel information which it passes to the GSM radio. This causes the GSM radio to switch to the new traffic channel to complete the handoff of the call from the WiFi to the GSM domains.

In the WiFi client, the GA-RRC 1434 provides a thin layer that abstracts the radio interface (e.g., particular characteristics of WiFi chipsets, etc.). For example, changing a design from a WiFi radio to a Bluetooth radio would primarily require modification of GA-RRC without any or substantial modification of GA-MC, NSC, etc.

When a call is not in progress the handoff between WiFi and GSM networks is referred to as an "idle" handoff. When the phone is idle, and an idle handoff is being initiated from the GSM to the WiFi networks, but has not yet been completed, the GSM radio may receive a page indicating that a call is to be delivered to phone. In order to abort or suspend the handoff to the WiFi network, the GSM RR 1466 implements an "early alert indicator" which provides a signal to the NSC that informs the NSC that a handoff to the WiFi network should not be performed. Once the phone receives the GSM call, an active handoff can be made to the WiFi network as described above.

Alternative versions of the system can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A telecommunication device comprising:
    an interface to a data network;
    an interface to a telephone system;
    wherein the telecommunication device is configured to communicate with a mobile unit over the interface to the data network, and to simulate, over the interface to the telephone system, presence of the mobile unit on a radio network associated with the telephone system by outputting one or more spoofed signal values that exceed corresponding signal values of the radio network; and
    wherein the telecommunication device is further configured to receive, in response to the one or more spoofed signal values, an indication that the mobile unit is granted registration with the data network.

2. The telecommunication device of claim 1, wherein the telecommunication device is further configured to simulate, over the interface to the telephone system, presence of the mobile unit on the radio network by outputting one or more spoofed signal values that are below corresponding signal values of the radio network; and wherein the telecommunication device is further configured to receive, in response to the one or more spoofed signal values, an indication that the mobile unit is denied registration with the data network.

3. The telecommunication device of claim 1, wherein the telecommunication device is configured to remove the mobile unit from association with the data network if the mobile unit goes outside a range of the data network.

4. The telecommunication device of claim 1, wherein the telecommunication device is further configured to simulate the presence of the mobile unit on the radio network by transmitting radio channel information to the radio network.

5. The telecommunication device of claim 1, wherein the telecommunication device is further configured to simulate the presence of the mobile unit on the radio network by transmitting authentication information to the radio network.

* * * * *